(12) United States Patent
Qiu et al.

(10) Patent No.: US 11,836,578 B2
(45) Date of Patent: Dec. 5, 2023

(54) UTILIZING MACHINE LEARNING MODELS TO PROCESS RESOURCE USAGE DATA AND TO DETERMINE ANOMALOUS USAGE OF RESOURCES

(71) Applicant: Accenture Global Solutions Limited, Dublin (IE)

(72) Inventors: Kun Qiu, San Diego, CA (US); Vijay Desai, San Diego, CA (US); Laser Seymour Kaplan, San Diego, CA (US); Durga Kalyan Ganjapu, North York (CA); Daniel Marcus Lombardo, San Diego, CA (US)

(73) Assignee: Accenture Global Solutions Limited, Dublin (IE)

(*) Notice: Subject to any disclaimer, the term of this patent is extended or adjusted under 35 U.S.C. 154(b) by 360 days.

(21) Appl. No.: 16/551,314

(22) Filed: Aug. 26, 2019

(65) Prior Publication Data
US 2020/0311603 A1 Oct. 1, 2020

Related U.S. Application Data

(60) Provisional application No. 62/826,405, filed on Mar. 29, 2019.

(51) Int. Cl.
 *G06N 20/00* (2019.01)
 *G06N 5/04* (2023.01)
 *G06F 9/455* (2018.01)

(52) U.S. Cl.
 CPC .............. *G06N 20/00* (2019.01); *G06N 5/04* (2013.01); *G06F 9/45533* (2013.01)

(58) Field of Classification Search
 None
 See application file for complete search history.

(56) References Cited

U.S. PATENT DOCUMENTS 9,535,917 B1 * 1/2017 Lin ...................... G06F 16/148
10,616,370 B2 * 4/2020 Bardhan ................ G06N 3/084
(Continued)

OTHER PUBLICATIONS

Narayan et al, "Smart metering of cloud services," 2012 IEEE International Systems Conference SysCon 2012, 2012, pp. 1-7, doi: 10.1109/SysCon.2012.6189462. (Year: 2012).*

(Continued)

*Primary Examiner* — Li B. Zhen
*Assistant Examiner* — Leah M Feitl
(74) *Attorney, Agent, or Firm* — Harrity & Harrity, LLP

(57) ABSTRACT

A device receives historical data associated with multiple cloud computing environments, trains one or more machine learning models, with the historical data, to generate trained machine learning models that generate outputs, and trains a model with the outputs to generate a trained model. The device receives particular data, associated with a cloud computing environment, that includes data identifying usage of resources associated with the cloud computing environment, and processes the particular data, with the trained machine learning models, to generate anomaly scores indicating anomalous usage of the resources associated with the cloud computing environment. The device processes the one or more anomaly scores, with the trained model, to generate a final anomaly score indicating anomalous usage of at least one of the resources associated with the cloud computing environment, and performs one or more actions based on the final anomaly score.

20 Claims, 14 Drawing Sheets

(56) References Cited

U.S. PATENT DOCUMENTS

| | | | | |
|---|---|---|---|---|
| 2013/0138816 | A1* | 5/2013 | Kuo | G06F 9/5011 709/226 |
| 2015/0350019 | A1* | 12/2015 | Terayama | G06F 11/3031 709/224 |
| 2016/0226901 | A1* | 8/2016 | Baikalov | H04L 63/1433 |
| 2017/0011437 | A1* | 1/2017 | Parameswaran | G06Q 30/04 |
| 2018/0060134 | A1* | 3/2018 | Bianchini | G06F 9/5077 |
| 2018/0331885 | A1* | 11/2018 | Raymond | H04L 41/044 |
| 2018/0336353 | A1* | 11/2018 | Manadhata | G06F 16/3334 |
| 2019/0065738 | A1 | 2/2019 | Kim et al. | |
| 2019/0199590 | A1* | 6/2019 | Bursell | G06F 9/5077 |
| 2019/0370610 | A1* | 12/2019 | Batoukov | G06F 11/3495 |
| 2020/0193234 | A1* | 6/2020 | Pai | G06F 16/904 |
| 2020/0242493 | A1* | 7/2020 | Botea | G01R 19/2513 |

OTHER PUBLICATIONS

Barr, "Programmatic Access to AWS Billing Data", published online Jun. 5, 2012, https://aws.amazon.com/blogs/aws/new-programmatic-access-to-aws-billing-data/ (Year: 2012).*

Aazam et al, "Cloud Customer's Historical Record Based Resource Pricing," in IEEE Transactions on Parallel and Distributed Systems, vol. 27, No. 7, pp. 1929-1940, Jul. 1, 2016, doi: 10.1109/TPDS.2015.2473850. (Year: 2016).*

Wrinch et al, "Anomaly detection of building systems using energy demand frequency domain analysis", 2012 IEEE Power and Energy Society General Meeting, 2012, pp. 1-6, doi: 10.1109/PESGM.2012.6344790. (Year: 2012).*

Guan et al, "Exploring Time and Frequency Domains for Accurate and Automated Anomaly Detection in Cloud Computing Systems," 2013 IEEE 19th Pacific Rim International Symposium on Dependable Computing, 2013, pp. 196-205, doi: 10.1109/PRDC.2013.40. (Year: 2013).*

Din et al, "A compressed framework for monitoring and anomaly detection in cloud networks," 2018 International Conference on Computing, Mathematics and Engineering Technologies (iCoMET), 2018, pp. 1-7, doi: 10.1109/ICOMET.2018.8346394. (Year: 2018).*

Han et al, "Analysing Virtual Machine Usage in Cloud Computing," 2013 IEEE Ninth World Congress on Services, 2013, pp. 370-377, doi: 10.1109/SERVICES.2013.9. (Year: 2013).*

Peng et al., "Virtual Machine Profiling for Analyzing Resource Usage of Applications". In: Ferreira, J., Spanoudakis, G., Ma, Y., Zhang, LJ. (eds) Services Computing—SCC 2018. SCC 2018. Lecture Notes in Computer Science(), vol. 10969. Springer, Cham. https://doi.org/10.1007/978-3-319-94376-3_7 (Year: 2018).*

Buda T.S., et al., "ADE: An Ensemble Approach for Early Anomaly Detection", 2017 IFIP/IEEE Symposium on Integrated Network and Service Management (IM), May 8, 2017, pp. 442-448, XP033127593.

Extended European Search Report for Application No. EP20165075.1, dated Aug. 18, 2020, 13 pages.

Vergeles A., et al., "Unsupervised Real-Time Stream-Based Novelty Detection Technique an Approach in a Corporate Cloud", 2018 IEEE Second International Conference on Data Stream Mining and Processing (DSMP), Aug. 21, 2018, pp. 166-170, XP033412536.

Bob Farzami, "Anomaly Detection with Dynamic Policies", https://www.metricly.com/reduce-false-alarms/, Jun. 24, 2019, 4 pages.

Cloudability Inc., "Anomaly Detection", https://www.cloudability.com/product/features/anomaly-detection/, Apr. 24, 2018, 4 pages.

Yotascale, Inc., "Cost Anomaly Detection", https://www.yotascale.com/cost-anomaly-detection, Nov. 7, 2018, 3 pages.

Forrest Brazeal, "Detecting AWS Cost Anomalies", https://www.trek10.com/blog/detecting-aws-cost-anomalies/, Jun. 25, 2018, 5 pages.

David Ramel, "Firm Uses Machine Learning to Detect AWS Cost Anomalies", https://awsinsider.net/articles/2017/06/27/cost-anomalies.aspx, Jun. 27, 2017, 3 pages.

GitHub, Inc., "SundaySky/cost-anomaly-detector", https://github.com/SundaySky/cost-anomaly-detector, Nov. 23, 2017, 9 pages.

Monali Ghosh, "Introducing Anomaly Detection in Centilytics", https://blogs.centilytics.com/introducing-anomaly-detection-in-centilytics/, Jul. 31, 2018, 3 pages.

Harold Bell, "Unveiling Cloud Cost Anomaly Detection from Xi Beam", https://www.nutanix.com/blog/unveiling-cloud-cost-anomaly-detection-xi-beam, Jan. 25, 2019, 8 pages.

* cited by examiner

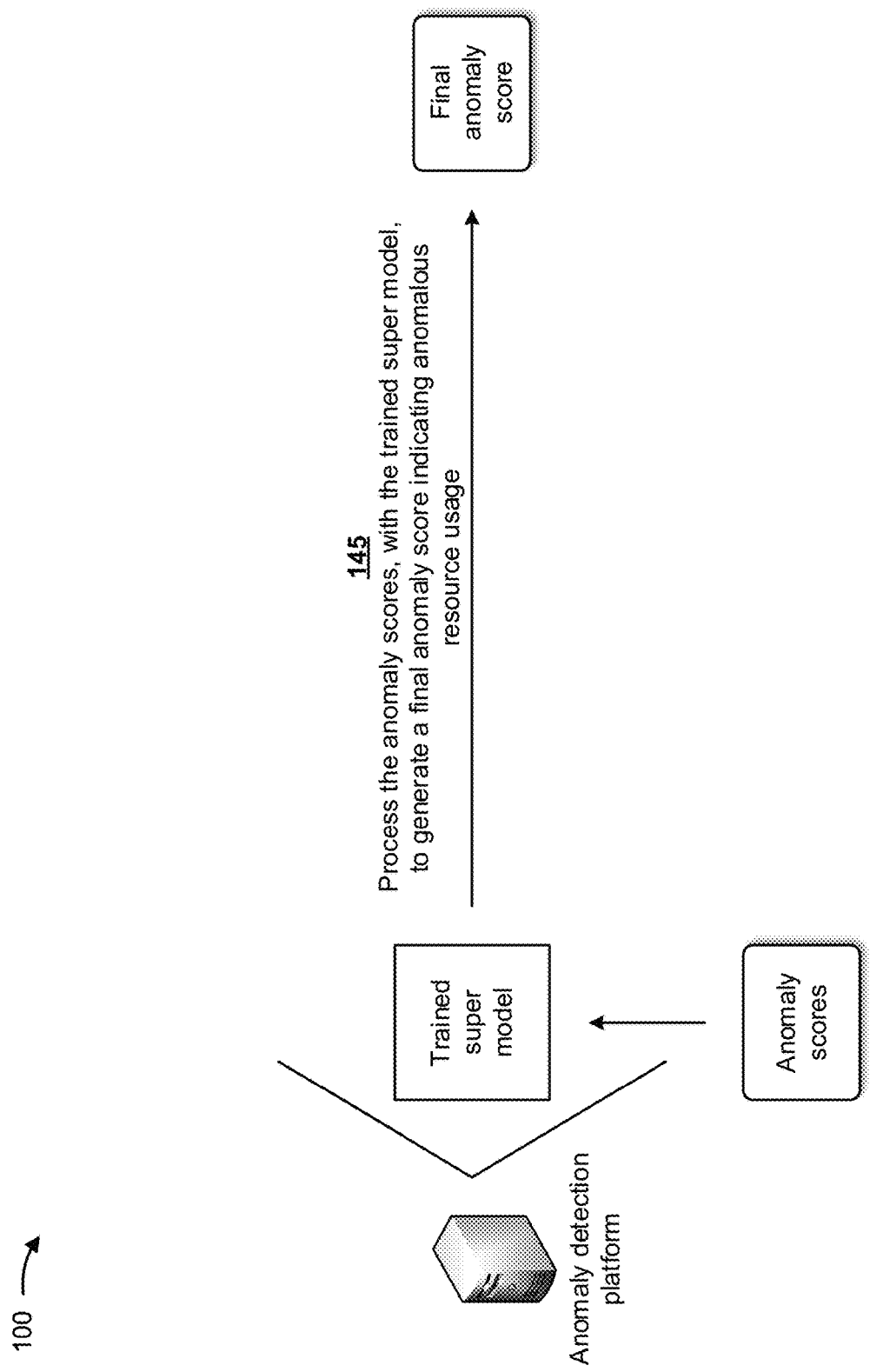

UTILIZING MACHINE LEARNING MODELS TO PROCESS RESOURCE USAGE DATA AND TO DETERMINE ANOMALOUS USAGE OF RESOURCES

RELATED APPLICATION

This application claims priority under 35 U.S.C. § 119 to U.S. Provisional Patent Application No. 62/826,405, filed on Mar. 29, 2019, and entitled "Anomaly Detection Platform," the content of which is incorporated by reference herein in its entirety.

BACKGROUND

Cloud computing may provide an on-demand availability of computing resources, especially data storage and computing power, without direct active management by a user. Large cloud computing environments often have functions distributed over multiple locations from central servers. Cloud computing environments may be limited to a single organization (e.g., referred to as an enterprise cloud), may be available to several organizations (e.g., referred to as a public cloud), or may be a combination of both (e.g., referred to as a hybrid cloud).

SUMMARY

According to some implementations, a method may include receiving historical data associated with multiple cloud computing environments, and training one or more machine learning models, with the historical data, to generate one or more trained machine learning models, wherein the training of the one or more machine learning models may generate outputs. The method may include training a model with the outputs to generate a trained model, and receiving particular data associated with a cloud computing environment, wherein the particular data may include at least data identifying usage of resources associated with the cloud computing environment. The method may include processing the particular data, with the one or more trained machine learning models, to generate one or more anomaly scores indicating anomalous usage of the resources associated with the cloud computing environment, and processing the one or more anomaly scores, with the trained model, to generate a final anomaly score indicating anomalous usage of at least one of the resources associated with the cloud computing environment. The method may include performing one or more actions based on the final anomaly score.

According to some implementations, a device may include one or more memories and one or more processors, communicatively coupled to the one or more memories, to receive particular data associated with a cloud computing environment, wherein the particular data may include at least data identifying usage of resources associated with the cloud computing environment. The one or more processors may process the particular data, with one or more trained machine learning models, to generate one or more anomaly scores indicating anomalous usage of the resources associated with the cloud computing environment, wherein one or more machine learning models may be trained, with historical data associated with multiple cloud computing environments, to generate the one or more trained machine learning models, and wherein the training of the one or more machine learning models may generate outputs. The one or more processors may process the one or more anomaly scores, with a trained model, to generate a final anomaly score indicating anomalous usage of at least one of the resources associated with the cloud computing environment, wherein a model may be trained with the outputs to generate the trained model. The one or more processors may perform one or more actions based on the final anomaly score.

According to some implementations, a non-transitory computer-readable medium may store one or more instructions. The one or more instructions, when executed by one or more processors of a device, may cause the one or more processors to receive historical data associated with multiple cloud computing environments, and determine a multi-entity profile for the historical data associated with the multiple cloud computing environments, wherein the multi-entity profile may include data groupings of the historical data based on a set of attributes included in the historical data. The one or more instructions may cause the one or more processors to identify trends and patterns in the historical data based on the data groupings of the multi-entity profile, and may train one or more machine learning models, with the historical data and data identifying the trends and the patterns, to generate one or more trained machine learning models, wherein the training of the one or more machine learning models may generate outputs. The one or more instructions may cause the one or more processors to train a model with the outputs to generate a trained model, and receive particular data associated with a cloud computing environment, wherein the particular data may include at least data identifying usage of resources associated with the cloud computing environment. The one or more instructions may cause the one or more processors to process the particular data, with the one or more trained machine learning models, to generate one or more anomaly scores indicating anomalous usage of the resources associated with the cloud computing environment. The one or more instructions may cause the one or more processors to process the one or more anomaly scores, with the trained model, to generate a final anomaly score indicating anomalous usage of at least one of the resources associated with the cloud computing environment, and perform one or more actions based on the final anomaly score.

BRIEF DESCRIPTION OF THE DRAWINGS

FIGS. 1A-1I are diagrams of one or more example implementations described herein.

DETAILED DESCRIPTION

Figure 1A:
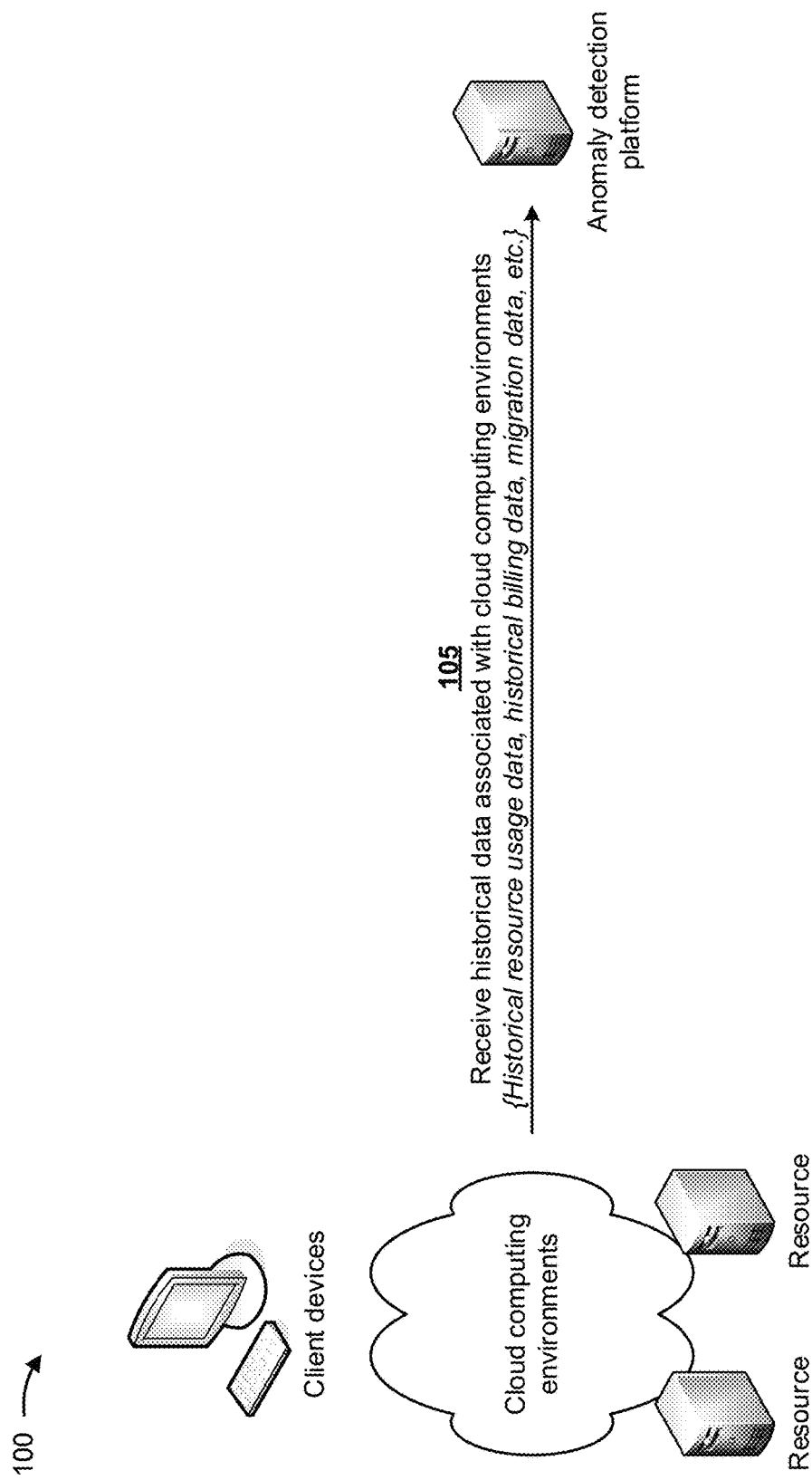

The following detailed description of example implementations refers to the accompanying drawings. The same reference numbers in different drawings may identify the same or similar elements.

Some organizations utilize cloud-based computing resources for data processing, data storage, application hosting, and/or the like. Often, these computing resources are allocated to the organization or for particular tasks on an as-needed or an as-requested basis. Monitoring computing resource usage in relation to historical usage and/or usage by similar organizations, for similar tasks, and/or the like is difficult due to having to analyze millions, billions, or more data points across thousands, millions, or more accounts. This results in poor management of computing resource usage and/or mis-allocation of computing resources, thereby wasting computing resources that could otherwise be allocated to other organizations and/or tasks, resulting in overuse of computing resources, and/or the like. In addition, anomalous usage (e.g., over-usage, usage of an unexpected combination of computing resources, and/or the like) of computing resources can disrupt operations of the organization, can result in significant expense to the organization, and/or the like.

Some implementations described herein provide an anomaly detection platform that utilizes machine learning models to process resource usage data and to determine anomalous usage of resources. For example, the anomaly detection platform may receive historical data associated with multiple cloud computing environments, and may train one or more machine learning models, with the historical data, to generate one or more trained machine learning models, where the training of the one or more machine learning models may generate outputs. The anomaly detection platform may train a model with the outputs to generate a trained model, and may receive particular data associated with a cloud computing environment, where the particular data at least includes data identifying usage of resources associated with the cloud computing environment. The anomaly detection platform may process the particular data, with the one or more trained machine learning models, to generate one or more anomaly scores indicating anomalous usage of the resources associated with the cloud computing environment. The anomaly detection platform may process the one or more anomaly scores, with the trained model, to generate a final anomaly score indicating anomalous usage of at least one of the resources associated with the cloud computing environment, and may perform one or more actions based on the final anomaly score.

In this way, the anomaly detection platform facilitates improved management of resources (e.g., processing resources, memory resources, networking resources, and/or the like) associated with a cloud computing environment. This reduces or eliminates over usage of the resources, thereby conserving the resources. In addition, this reduces or eliminates over allocation of resources, thereby reducing instances of idle or unused resources and improving a utilization efficiency of the resources. Further, improving management of resources through improved anomaly detection facilitates improved cost management with regard to the resources and improved planning with regard to future resource needs.

FIGS. 1A-1I are diagrams of one or more example implementations 100 described herein. As shown in FIG. 1A, cloud computing environments may include resources (e.g., processing resources, memory resources, network resources, and/or the like) and may communicate with multiple client devices. For example, the client devices may access the cloud computing environments to utilize the resources for performance of one or more tasks. The cloud computing environments may include the features described below in connection with FIG. 2. The cloud computing environments may also be associated with an anomaly detection platform.

As further shown in FIG. 1A, and by reference number 105, the anomaly detection platform may receive historical data associated with the cloud computing environments. In some implementations, the anomaly detection platform may receive the historical data from, for example, one or more of the client devices, one or more of the resources, and/or the like. The historical data may include data identifying a usage of a set of resources associated with an organization. For example, the historical data may include data identifying types of resources used by the organization, quantities of the resources used, times of day or days of the week when the resources are used, costs associated with the resources used by an organization (e.g., billing data), and/or the like. In some implementations, the historical data may include data identifying a migration plan for an organization with regard to resources. For example, the historical data may include data identifying when resources are to be transitioned from non-cloud-based resources (e.g., server devices managed by an organization) to cloud-based resources (e.g., of the cloud computing environments), which types of resources are to be transitioned, whether the resources are to undergo an upgrade or a downgrade after being transitioned, and/or the like.

In some implementations, the anomaly detection platform may continuously receive the historical data from the cloud computing environments, may periodically receive the historical data from the cloud computing environments, and/or the like. The anomaly detection platform may store the historical data in a data structure (e.g., a database, a table, a list, and/or the like) associated with the anomaly detection platform. In some implementations, there may be hundreds, thousands, millions, and/or the like, of resources that produce thousands, millions, billions, and/or the like, of data points provided in the historical data. In this way, the analytical platform may handle thousands, millions, billions, and/or the like, of data points within a period of time (e.g., daily, weekly, monthly), and thus may provide "big data" capability.

Figure 1B:
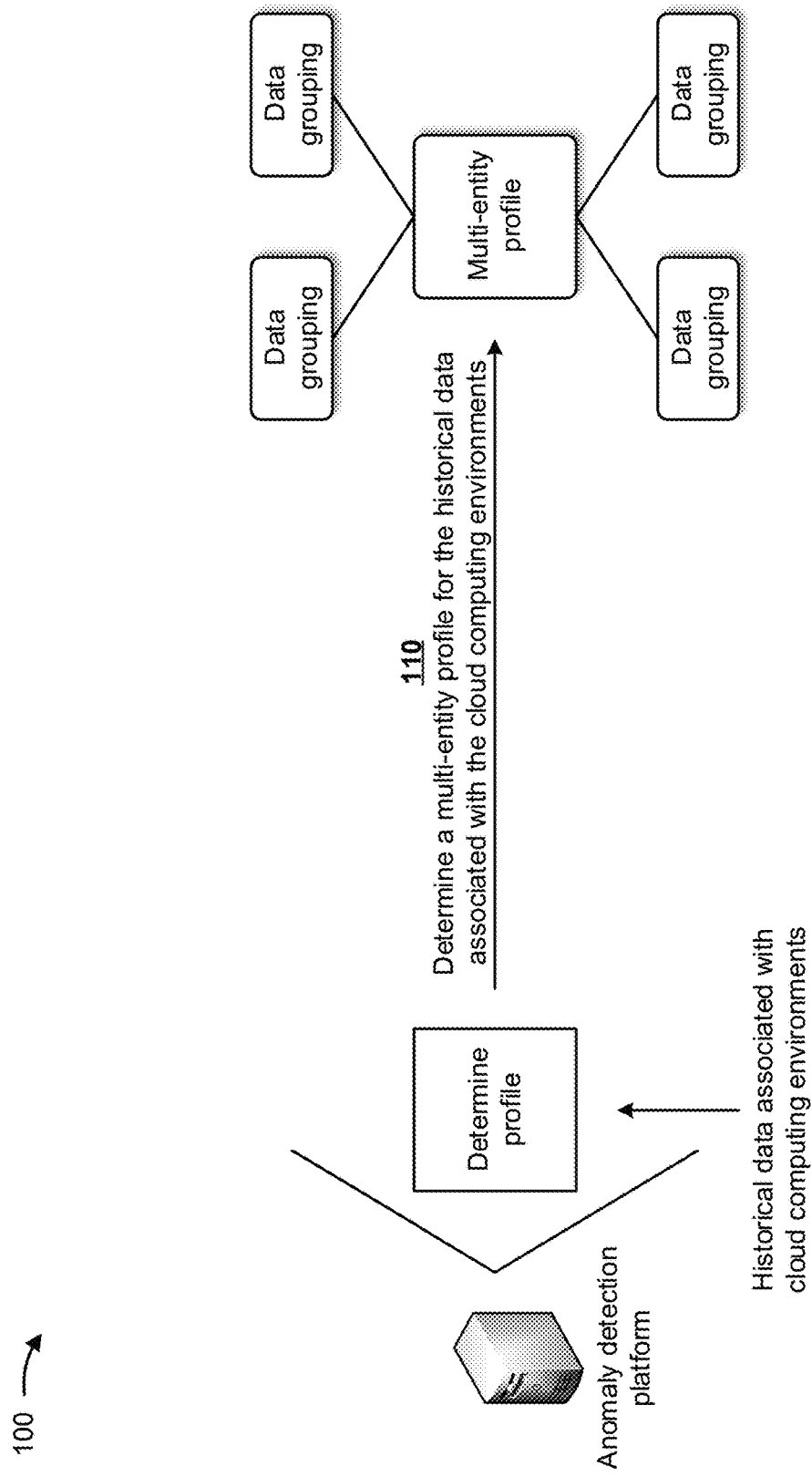

As shown in FIG. 1B, and by reference number 110, the anomaly detection platform may determine a multi-entity profile for the historical data associated with the cloud computing environments. For example, the anomaly detection platform may determine the multi-entity profile after receiving the historical data, based on a request to determine the multi-entity profile, and/or the like. A multi-entity profile may include a set of groupings of the historical data (e.g., data groupings) based on a set of attributes included in the historical data. For example, the multi-entity profile may organize the historical data by types of resources, by tasks for which resources are organized, by users of the resources, by costs associated with resources, and/or the like.

Figure 1C:
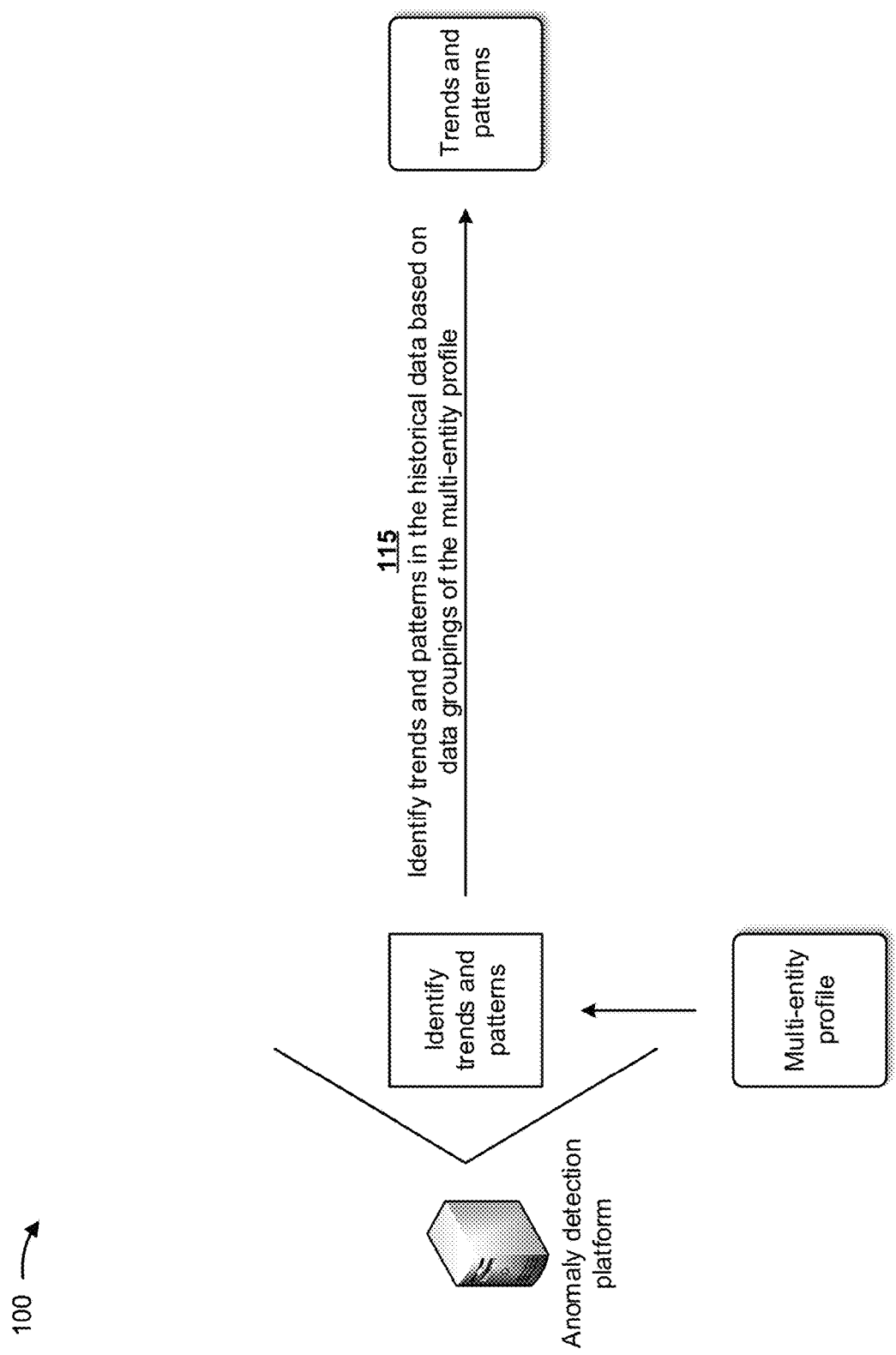

As shown in FIG. 1C, and by reference number 115, the anomaly detection platform may identify trends and/or patterns in the historical data based on the data groupings of the multi-entity profile. The anomaly detection platform may process the data groupings of the multi-entity profile to, for example, identify trends, patterns, and/or the like in the data. Continuing with the previous example, the anomaly detection platform may process the data groupings of the multi-entity profile by organization, by task, by resource, by user, and/or the like. In this way, the anomaly detection platform may identify trends, patterns, and/or the like according to various attributes of the data groupings of the multi-entity profile. In some implementations, the anomaly detection platform may utilize a trend analysis technique (e.g., a regression analysis, a Mann-Kendall test, and/or the like), a pattern recognition technique (e.g., a classification model, a clustering model, an ensemble learning model, and/or the like), and/or the like to identify trends and/or patterns in the historical data based on the data groupings of the multi-entity profile.

Figure 1D:
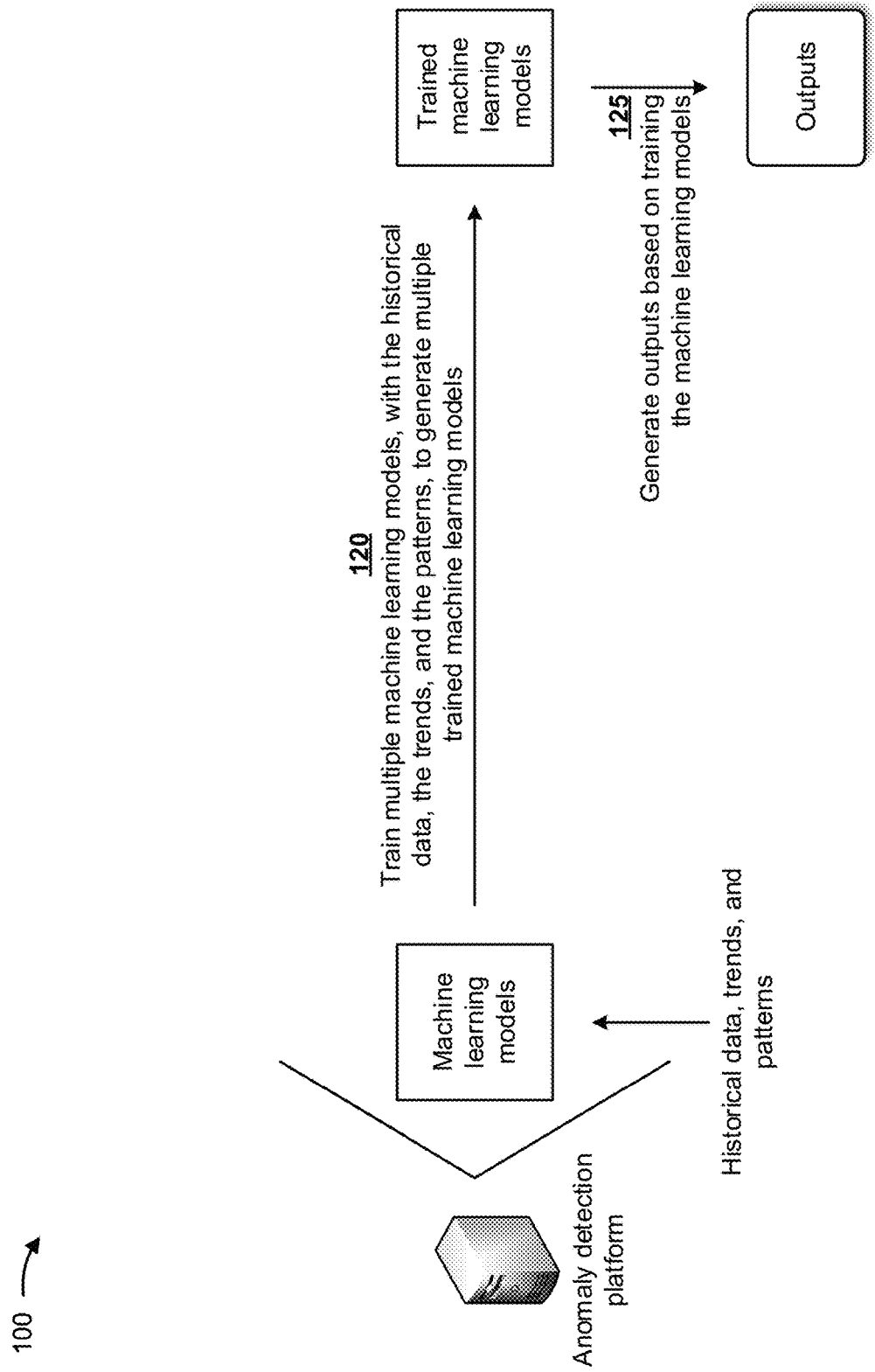

As shown in FIG. 1D, and by reference number 120, the anomaly detection platform may train multiple machine learning models, with the historical data and data identifying the trends and/or the patterns in the historical data, to generate multiple trained machine learning models. In some implementations, the machine learning models may include a kernel density estimation model, a regression splines model, a Gaussian process regression model, a discrete cosine transform signal processing model, a wavelet signal processing model, a filter banks signal processing model, and/or the like. The trained machine learning models may be utilized by the anomaly detection platform to determine anomaly scores indicating anomalies (e.g., related to resource usage by an organization) in data received from a cloud computing environment (e.g., similar to the historical data).

In some implementations, the anomaly detection platform may train the machine learning models, with the historical data and the data identifying the trends and/or the patterns in the historical data, to identify anomaly scores for the historical data and the data identifying the trends and/or the patterns in the historical data. For example, the anomaly detection platform may separate the historical data and the data identifying the trends and/or the patterns in the historical data into a training set, a validation set, a test set, and/or the like. The training set may be utilized to train the machine learning models. The validation set may be utilized to validate results of the trained machine learning models. The test set may be utilized to test operation of the machine learning models.

In some implementations, the anomaly detection platform may train the machine learning models using, for example, an unsupervised training procedure and based on the historical data and the data identifying the trends and/or the patterns in the historical data. For example, the anomaly detection platform may perform dimensionality reduction to reduce the historical data and the data identifying the trends and/or the patterns in the historical data to a minimum feature set, thereby reducing resources (e.g., processing resources, memory resources, and/or the like) to train the machine learning models, and may apply a classification technique to the minimum feature set.

In some implementations, the anomaly detection platform may use a logistic regression classification technique to determine a categorical outcome (e.g., that the historical data and the data identifying the trends and/or the patterns in the historical data include particular anomalies). Additionally, or alternatively, the anomaly detection platform may use a naïve Bayesian classifier technique. In this case, the anomaly detection platform may perform binary recursive partitioning to split the historical data and the data identifying the trends and/or the patterns in the historical data into partitions and/or branches and use the partitions and/or branches to determine outcomes (e.g., that the historical data and the data identifying the trends and/or the patterns in the historical data include particular anomalies). Based on using recursive partitioning, the anomaly detection platform may reduce utilization of computing resources relative to manual, linear sorting and analysis of data points, thereby enabling use of thousands, millions, or billions of data points to train the machine learning models, which may result in more accurate models than using fewer data points.

Additionally, or alternatively, the anomaly detection platform may use a support vector machine (SVM) classifier technique to generate a non-linear boundary between data points in the training set. In this case, the non-linear boundary is used to classify test data into a particular class.

Additionally, or alternatively, the anomaly detection platform may train the machine learning models using a supervised training procedure that includes receiving input to one or more of the machine learning models from a subject matter expert, which may reduce an amount of time, an amount of processing resources, and/or the like to train the machine learning models relative to an unsupervised training procedure. In some implementations, the anomaly detection platform may use one or more other model training techniques, such as a neural network technique, a latent semantic indexing technique, and/or the like. For example, the anomaly detection platform may perform an artificial neural network processing technique (e.g., using a two-layer feedforward neural network architecture, a three-layer feedforward neural network architecture, and/or the like) to perform pattern recognition with regard to patterns of the historical data and the data identifying the trends and/or the patterns in the historical data. In this case, using the artificial neural network processing technique may improve an accuracy of the trained machine learning models generated by the anomaly detection platform by being more robust to noisy, imprecise, or incomplete data, and by enabling the anomaly detection platform to detect patterns and/or trends undetectable to human analysts or systems using less complex techniques.

As further shown in FIG. 1D, and by reference number 125, outputs may be generated based on training the machine learning models. In some implementations, the outputs generated based on training the machine learning models may include anomaly scores (e.g., indicating anomalies related to resource usage by organizations) generated by each of the multiple machine learning models. For example, the kernel density estimation model may generate a first anomaly score, the regression splines model may generate a second anomaly score, the Gaussian process regression model may generate a third anomaly score, the discrete cosine transform signal processing model may generate a fourth anomaly score, the wavelet signal processing model may generate a fifth anomaly score, the filter banks signal processing model may generate a sixth anomaly score, and/or the like.

In some implementations, the kernel density estimation model may provide a smooth function of a histogram, and various kernels may be utilized for smoothing, such as a Gaussian kernel. For example, a custom class may be written to create kernel density estimation curves, a quantity (n) of data points may be sampled, each of the sampled data points may be made a center of a Gaussian curve, a bandwidth of each Gaussian curve may be defined by rule of thumb, and an average over Gaussian curves provides the kernel density estimation. In some implementations, a cumulative distribution function may be obtained using the kernel density estimation model. A cumulative distribution function is a cumulative sum of a probability, calculated from a probability density function (e.g., an estimate of a probability distribution function in the form of a kernel density estimation curve). New cost data may be compared to a cumulative distribution function generated by historical data, where a higher probability indicates a higher likelihood of being an anomaly. A custom class may be created to estimate cumulative distribution function scores. The kernel density estimation may include a mixture of Gaussian probability density functions, and an average over values of the Gaussian curves may provide a cumulative distribution function score. For example, an anomaly score may be determined from $$\frac{1}{n}\sum C_i,$$

where $$C_i = \frac{1}{2} + \frac{1}{2}\text{erf}\left[\frac{(x-u_i)}{b\sqrt{2}}\right],$$

x is a current data point, b is a kernel bandwidth, $u_i$ is a mean of sample kernel, and n is a number of kernels.

In some implementations, the anomaly detection platform may utilize a quantile model to generate anomaly scores. A quantile model may be similar to a kernel density estimation model, but may utilize interpolation methods instead of smoothing methods. A quantile model divides a dataset into equally partitioned groups, and a quantile model may output a score that includes a value of a distribution at a given percentile (e.g., a quantile model score of 0.5 returns a median of the dataset, a quantile model score of 1.0 returns a maximum of the dataset, and/or the like). Given a percentile (p), the quantile model may calculate a quantile (q) of data in a time (T), may define a scaling factor (s), and may determine that costs above q*s are considered anomalies (e.g., where the percentile may be large so that most of the data falls below the anomalies and the scaling factor may be close to one).

In some implementations, the kernel density estimation model and the quantile model may not require training data, but synthetic training data may be utilized for training the kernel density estimation model and the quantile model. The synthetic training data may be useful for validating and comparing with other models, and may be created via an anomaly detection method that uses future data, via manual indication of anomalous point, and/or the like.

In some implementations, the anomaly detection platform may weight the outputs of training the machine learning model by a total amount of change. For example, if a cost is consistent over time, small changes may be reported as large anomalies. In such an example, the anomaly detection platform may silence anomalies where a change in a cost is below a predefined threshold that may be adjusted. In some implementations, the anomaly detection platform may weight the outputs by a percent change. For example, a high cost is a relative term that may change over time for a given client as the client adjusts spending. In such an example, the anomaly detection platform may silence anomalies where a percent change in cost is below a predefined threshold that may be adjusted.

Figure 1E:
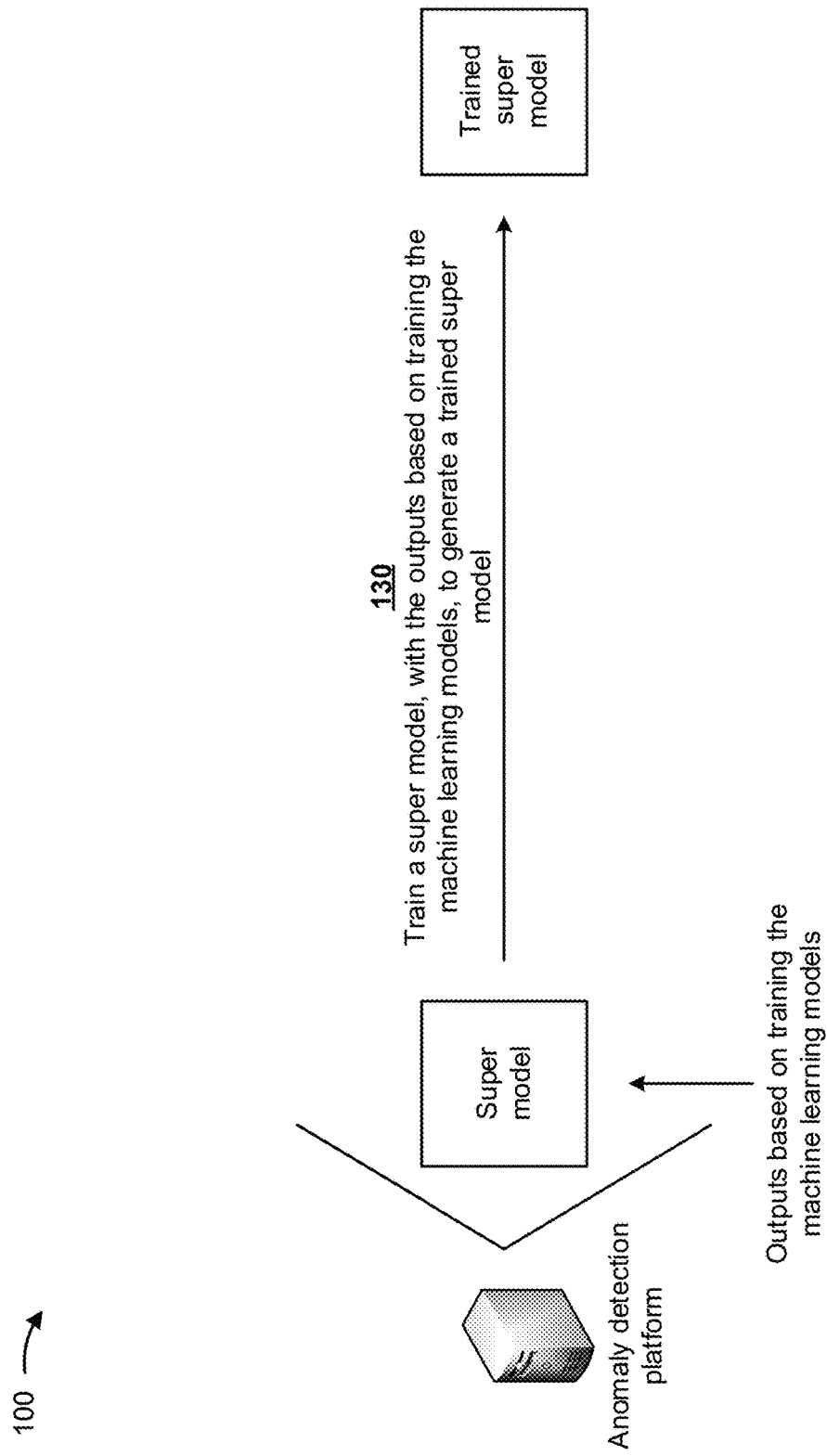

As shown in FIG. 1E, and by reference number 130, the anomaly detection platform may train a super model, with the outputs based on training the machine learning models, to generate a trained super model. In some implementations, the super model may include a model that determines an average anomaly score, a mean anomaly score, a particular anomaly score (e.g., a best anomaly score), a weighted average anomaly score, and/or the like based on anomaly scores output from the various machine learning models. For example, the anomaly detection platform may generate the super model based on combining output from training the various machine learning models with the historical data, the data identifying trends and/or patterns in the historical data, and/or the like. Continuing with the previous example, the anomaly detection platform may generate the super model by training a machine learning model on scores output from the various machine learning models (e.g., that indicate detection of an anomaly). The machine learning model may, for example, be similar to that described elsewhere herein and may be trained in a manner described above in connection with FIG. 1D.

For example, outputs of two different kernel density estimation models and two different quantile models may be utilized to train a super model (e.g., a random forest model, an isolation forest model, a robust randomly cut forest model, and/or the like). Overall anomaly prediction may be improved by combining the outputs (e.g., anomaly scores) of two different kernel density estimation models and two different quantile models. The super model may be trained with synthetic data when the super model first goes live. Models may be added to or subtracted from the super model over time and may cause changes to the synthetic training data. The super model may predict anomalies per day, where daily predictions may be provided as scores from 0 to 1, with higher values representing more anomalous days. A threshold may be defined to determine cutoff scores to report as anomalies. After generating an anomaly alert, the anomaly detection platform may silence all anomaly alerts over the next few days, which may prevent clients from repeatedly receiving alerts for an anomalous time period they already know about.

Figure 1F:
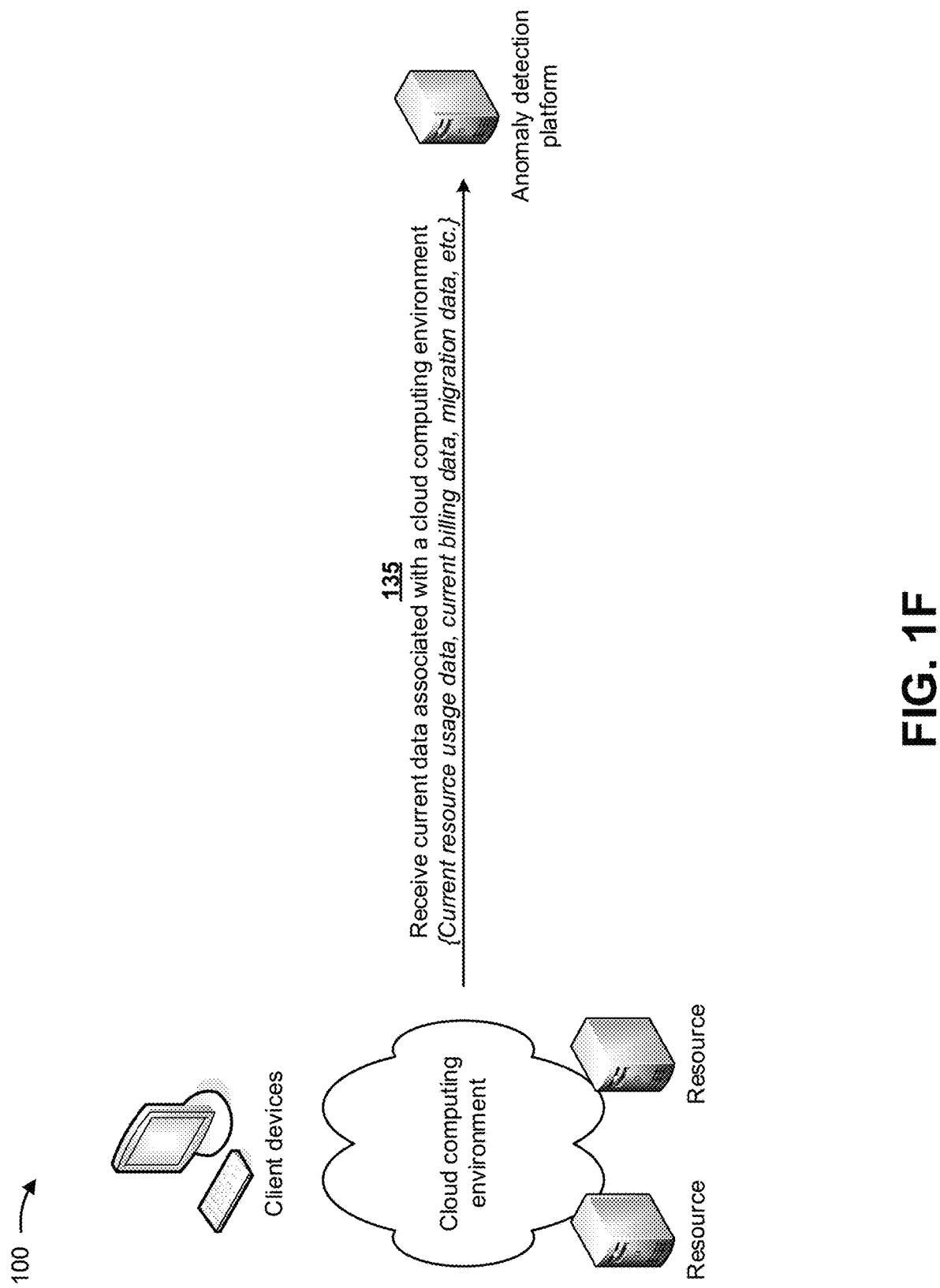

As shown in FIG. 1F, and by reference number 135, the anomaly detection platform may receive current data associated with a cloud computing environment. The cloud computing environment may include resources (e.g., computing resources, processing resources, memory resources, network resources, and/or the like) and may be associated with client devices. In some implementations, the anomaly detection platform may receive the current data from, for example, one or more of the client devices, one or more of the resources, and/or the like. The current data may include data identifying a usage of a set of resources associated with an organization. For example, the current data may include data identifying types of resources used by the organization, quantities of the resources used, times of day or days of the week when the resources are used, costs associated with the resources used by the organization (e.g., billing data), and/or the like. In some implementations, the current data may include data identifying a migration plan for an organization with regard to resources. For example, the current data may include data identifying when resources are to be transitioned from non-cloud-based resources (e.g., server devices managed by an organization) to cloud-based resources (e.g., of the cloud computing environment), which types of resources are to be transitioned, whether the resources are to undergo an upgrade or a downgrade after being transitioned, and/or the like.

In some implementations, the anomaly detection platform may continuously receive the current data from the cloud computing environment (e.g., in real-time or near real-time), may periodically receive the current data from the cloud computing environment, and/or the like. The anomaly detection platform may store the current data in a data structure (e.g., a database, a table, a list, and/or the like) associated with the anomaly detection platform.

Figure 1G:
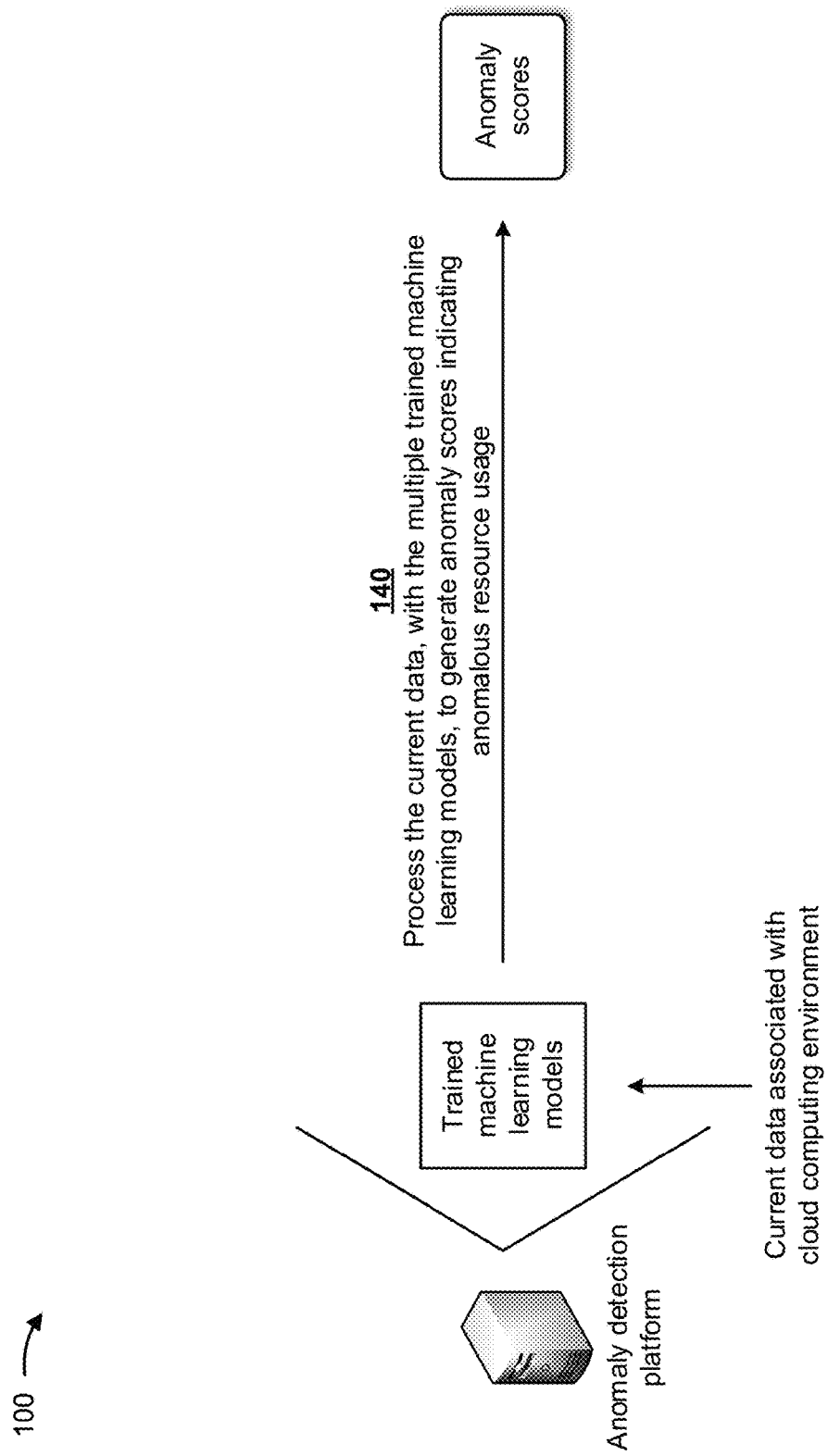

As shown in FIG. 1G, and by reference number 140, the anomaly detection platform may process the current data, with the multiple trained machine learning models, to generate anomaly scores indicating anomalous resource usage of the cloud computing environment. In some implementations, each of the trained machine learning models may generate an anomaly score indicating an anomaly related to resource usage of the cloud computing environment by an organization. For example, the kernel density estimation model may generate a first anomaly score indicating underutilization of a processing resource, the regression splines model may generate a second anomaly score indicating underutilization of a memory resource, the Gaussian process regression model may generate a third anomaly score indicating overutilization of a network resource, the discrete cosine transform signal processing model may generate a fourth anomaly score indicating overutilization of a processing resource, the wavelet signal processing model may generate a fifth anomaly score indicating overutilization of a memory resource, the filter banks signal processing model may generate a sixth anomaly score indicating misallocation of a processing resource, and/or the like.

As shown in FIG. 1H, and by reference number 145, the anomaly detection platform may process the anomaly scores, with the trained super model, to generate a final anomaly score indicating anomalous resource usage of the cloud computing environment. The anomaly detection platform may use the trained super model to process the anomaly scores from the various trained machine learning models that are used to process the current data. For example, the anomaly detection platform may receive the current data (e.g., in real-time or near real-time) associated with the cloud computing environment, may process the current data using the various trained machine learning models, and may process outputs from the various trained machine learning models using the super model. The super model may output a final anomaly score that indicates a presence of an anomaly in usage of one or more resources of the cloud computing environment.

For example, the trained super model may apply different weights to the different anomaly scores generated by the trained machine learning models, and add the weighted anomaly scores together to determine the final anomaly score. In another example, the trained super model may divide a sum of the weighted anomaly scores by the quantity of anomaly scores to determine a weighted average anomaly score as the final anomaly score. In still another example, the trained super model may add the anomaly scores, and may divide a sum of the anomaly scores by the quantity of anomaly scores to determine an average anomaly score as the final anomaly score.

Figure 1I:
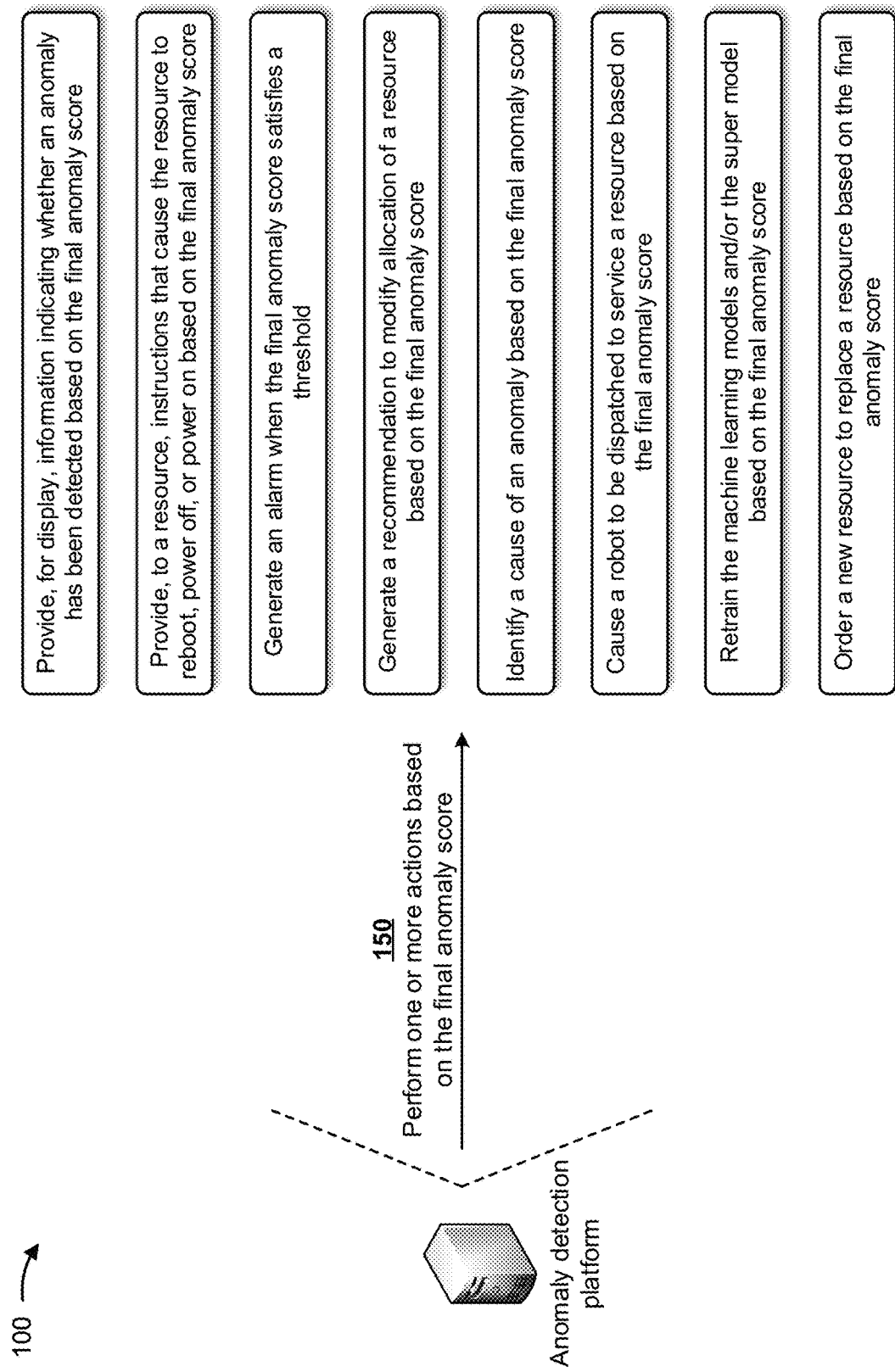

As shown in FIG. 1I, and by reference number 150, the anomaly detection platform may perform one or more actions based on the final anomaly score. In some implementations, the one or more actions may include the anomaly detection platform providing, for display, information indicating whether an anomaly has been detected based on the final anomaly score. In this way, the anomaly detection platform may alert individuals responsible for managing resource usage, and the individuals may address the anomaly and conserve resources in the future.

In some implementations, the one or more actions may include the anomaly detection platform providing, to a resource, instructions that cause the resource to reboot, power off, or power on based on the final anomaly score. In this way, the anomaly detection platform may better control usage of the resource and prevent underutilization or overutilization of the resource.

In some implementations, the one or more actions may include the anomaly detection platform generating an alarm when the final anomaly score satisfies a threshold during a time period, when resource usage deviates from a predicted usage by a threshold amount, and/or the like. For example, the anomaly detection platform may activate a light, may output a sound via a speaker of a client device, may configure an account to display a message when a user is logged into the account, and/or the like. This may prevent underutilization or overutilization of the resource.

In some implementations, the one or more actions may include the anomaly detection platform generating a recommendation to modify allocation of a resource for an organization based on the final anomaly score. For example, the anomaly detection platform may generate a recommendation based on an amount by which an actual usage deviates from an expected usage, and may provide information for display, in a message to a client device, and/or the like, that identifies the recommendation. In this way, the anomaly detection platform may provide the recommendation to individuals responsible for managing resource usage, and the individuals may address the anomaly and conserve resources in the future.

In some implementations, the one or more actions may include the anomaly detection platform identifying a cause of an anomaly based on the final anomaly score. For example, by monitoring scores from various machine learning models related to different attributes of the current data, the anomaly detection platform may be capable of detecting a source of an anomalous usage. Continuing with the previous example, the anomaly detection platform may be capable of detecting a particular type of resource, an amount of time of the usage, a quantity of tasks, and/or the like that is the cause of the anomalous usage, based on scores output by corresponding machine learning models.

In some implementations, the one or more actions may include the anomaly detection platform causing a robot to be dispatched to service a resource based on the final anomaly score. For example, the robot may be dispatched to replace a resource, replace a component of a resource, record video of a resource, power off a resource, power on a resource, and/or the like.

In some implementations, the one or more actions may include the anomaly detection platform retraining the machine learning models and/or the super model based on the final anomaly score. In this way, the machine learning models and/or the super model may better predict anomalies associated with a cloud computing environment.

In some implementations, the one or more actions may include the anomaly detection platform ordering a new resource to replace a resource based on the final anomaly score. For example, the anomaly detection platform may order a new processor for a server device of the cloud computing environment based on determining that an existing processor of the server device is nonoperational.

In some implementations, the anomaly detection platform may determine a reallocation of the resources of the cloud computing environment based on the final anomaly score, and may cause the reallocation of the resources to be implemented by the cloud computing environment.

In some implementations, the anomaly detection platform may identify a type of resource, and may determine a quantity of usage time of a resource and a quantity of tasks performed by a resource. The anomaly detection platform may determine a reallocation for the resources based on the type of the resource, the quantity of usage time of the resource, and the quantity of tasks performed by the resource, and may cause the reallocation to be implemented by the cloud computing environment.

In some implementations, the anomaly detection platform may be utilized to determine anomalies associated with virtual machines of a cloud computing environment. The anomaly detection platform may perform frequency domain analysis of usage patterns of individual virtual machines in order to identify changes in the usage patterns. The anomaly detection platform may utilize discrete cosine transform (DCT), type 2, to analyze a frequency spectrum of usage data for each individual virtual machine over a window of thirty days. A DCT output vector may include a length (720) (e.g., 30 days×24 hours). DCT vector data may be passed through a filter bank (e.g., each filter being triangular and exponentially placed) resulting in a much smaller output vector. For a filter bank with 32 triangular filters, the output vector may include a length of 32. The output vectors may be compared with output from different time periods, and virtual machines with considerable change are identified as anomalies. The filter bank output may be used for behavioral grouping of virtual machines. Output vectors from all virtual machines are provided to an unsupervised clustering model (e.g., DBSCAN) that estimates natural clusters in data. Since the filter bank output captures how usage patterns are varying, these clusters will group virtual machines that behave similarly, and virtual machines that do not fall into any of the groups are identified as outliers and are selected. Clusters may be estimated daily, and virtual machines that shift from one cluster to another are identified and selected as anomalies as there could be some change in behavior which needs to be reviewed.

In this way, several different stages of the process for processing resource usage data and determining anomalous usage of resources may be automated via machine learning models, which may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that utilizes machine learning models to process resource usage data and to determine anomalous usage of resources. Further, the process for utilizing machine learning models to process resource usage data and to determine anomalous usage of resources conserves resources (e.g., processing resources, memory resources, network resources, and/or the like) that would otherwise be wasted in poor management of resource usage, mis-allocation of resources, overuse of resources, and/or the like.

As indicated above, FIGS. 1A-1I are provided merely as examples. Other examples may differ from what is described with regard to FIGS. 1A-1I.

Figure 2:
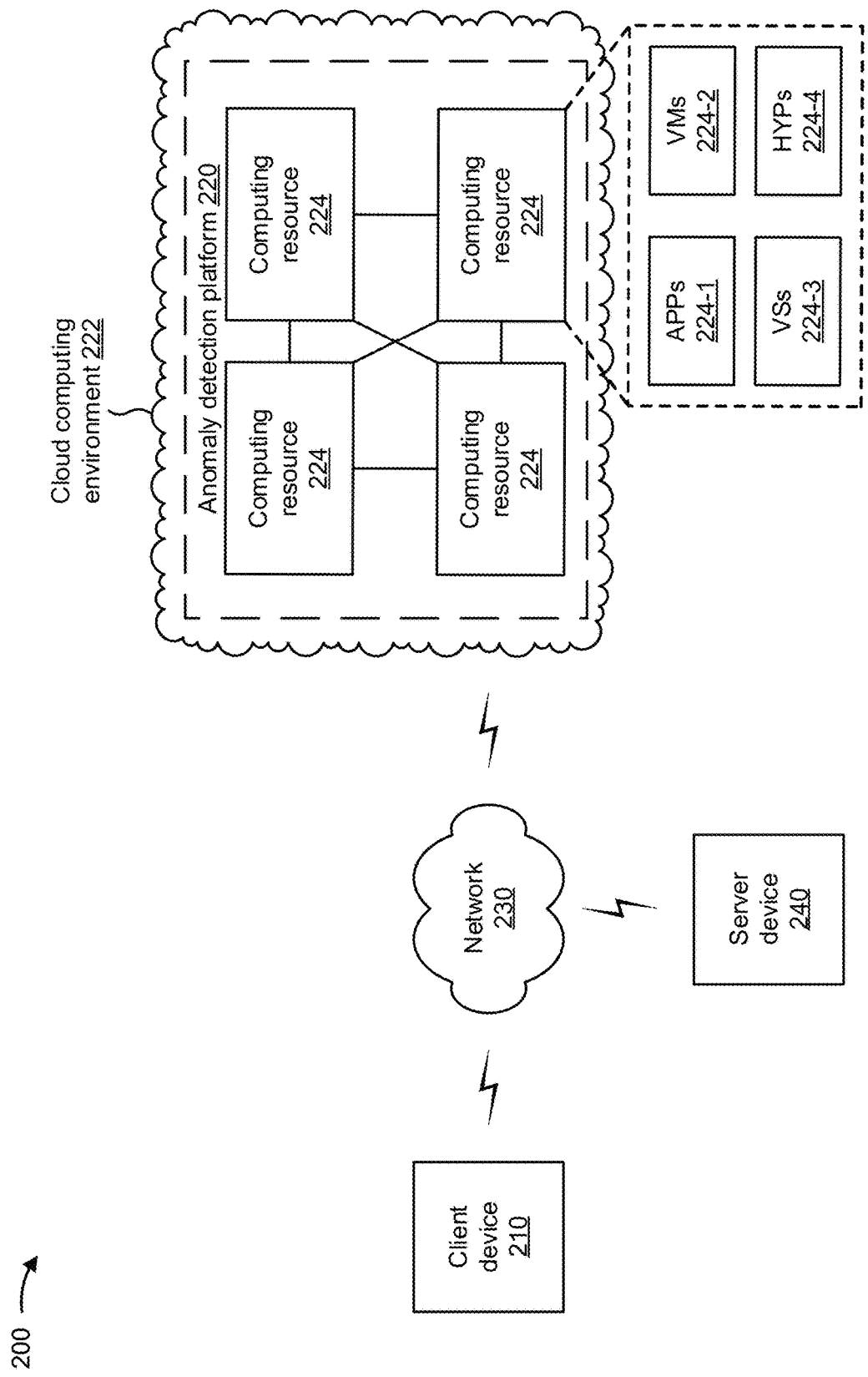
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an anomaly detection platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to anomaly detection platform 220 and/or server device 240.

Anomaly detection platform 220 includes one or more devices that utilize machine learning models to process resource usage data and to determine anomalous usage of resources. In some implementations, anomaly detection platform 220 may be designed to be modular such that certain software components may be swapped in or out depending on a particular need. As such, anomaly detection platform 220 may be easily and/or quickly reconfigured for different uses. In some implementations, anomaly detection platform 220 may receive information from and/or transmit information to one or more client devices 210 and/or server devices 240.

In some implementations, as shown, anomaly detection platform 220 may be hosted in a cloud computing environment 222. Notably, while implementations described herein describe anomaly detection platform 220 as being hosted in cloud computing environment 222, in some implementations, anomaly detection platform 220 may not be cloud-based (i.e., may be implemented outside of a cloud computing environment) or may be partially cloud-based.

Cloud computing environment 222 includes an environment that hosts anomaly detection platform 220. Cloud computing environment 222 may provide computation, software, data access, storage, etc., services that do not require end-user knowledge of a physical location and configuration of system(s) and/or device(s) that hosts anomaly detection platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host anomaly detection platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with anomaly detection platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 and/or server device 240 or an operator of anomaly detection platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation 5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with an entity as described above. In some implementations, server device 240 may receive information from and/or transmit information to client device 210 and/or anomaly detection platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
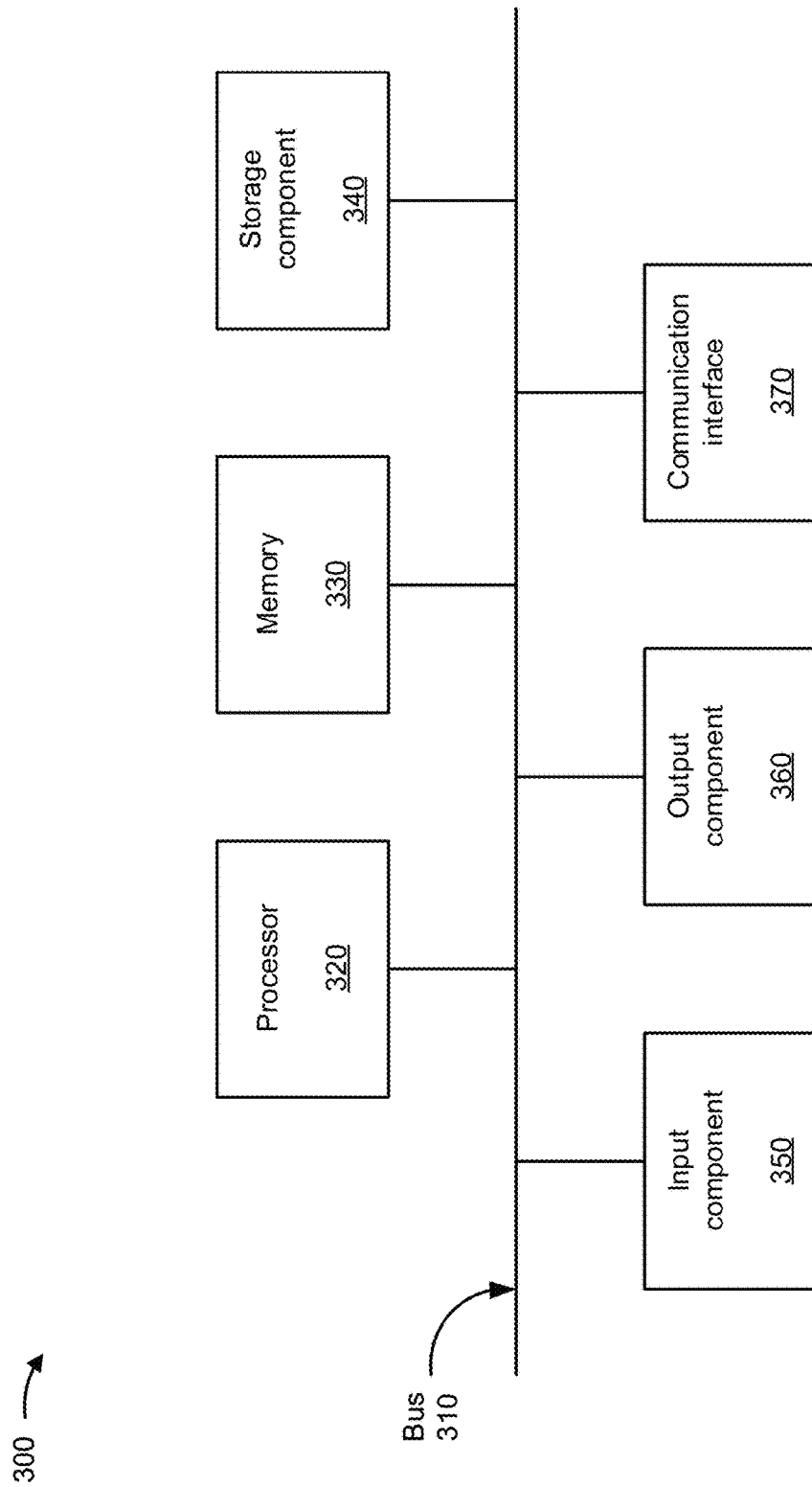
FIG. 3 is a diagram of example components of one or more devices of FIG. 2.

FIG. 3 is a diagram of example components of a device 300. Device 300 may correspond to client device 210, anomaly detection platform 220, computing resource 224, and/or server device 240. In some implementations, client device 210, anomaly detection platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
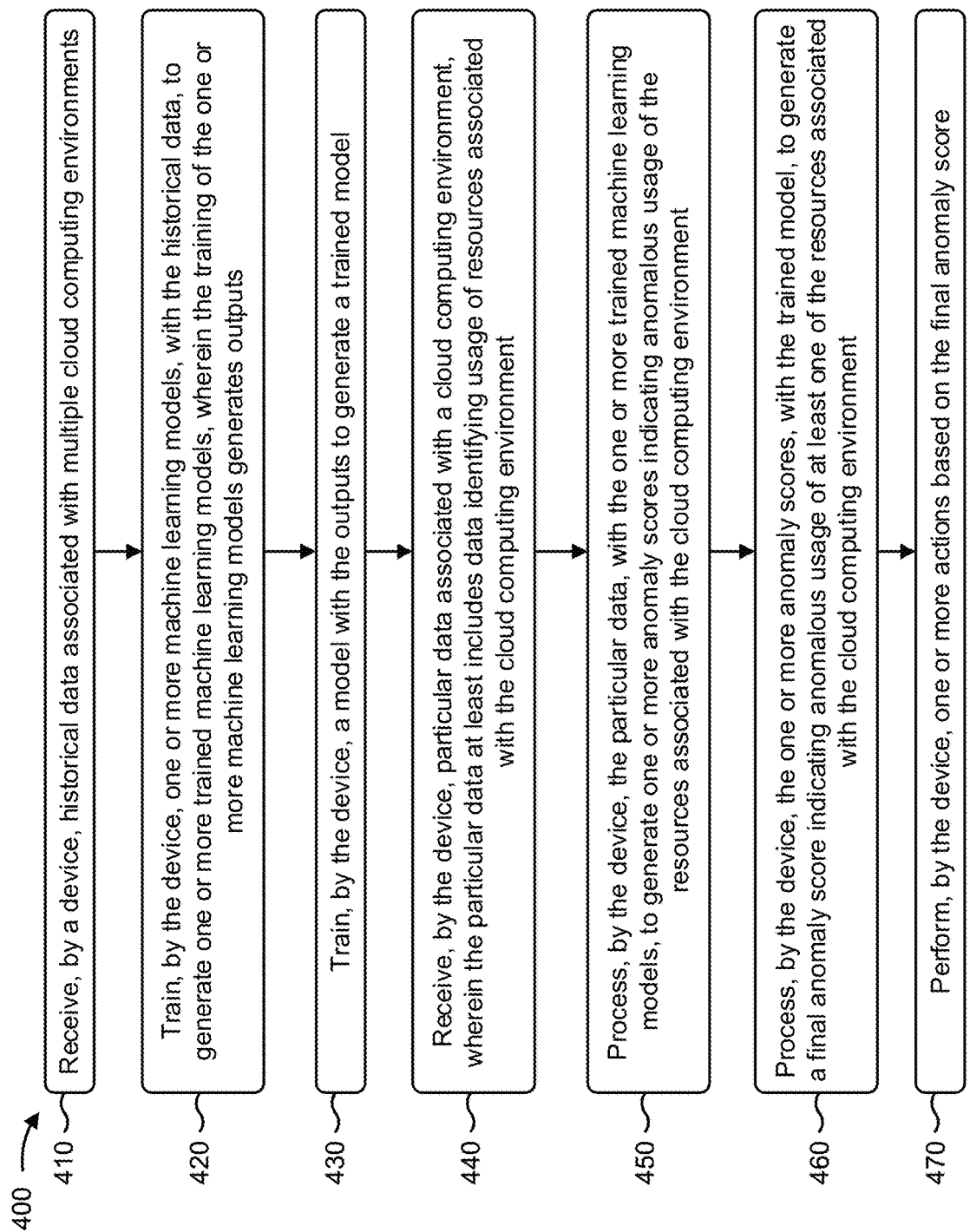
FIGS. 4-6 are flow charts of example processes for utilizing machine learning models to process resource usage data and to determine anomalous usage of resources.

FIG. 4 is a flow chart of an example process 400 for utilizing machine learning models to process resource usage data and to determine anomalous usage of resources. In some implementations, one or more process blocks of FIG. 4 may be performed by an anomaly detection platform (e.g., anomaly detection platform 220). In some implementations, one or more process blocks of FIG. 4 may be performed by another device or a group of devices separate from or including the anomaly detection platform, such as a client device (e.g., client device 210) and/or a server device (e.g., server device 240).

As shown in FIG. 4, process 400 may include receiving historical data associated with multiple cloud computing environments (block 410). For example, the anomaly detection platform (e.g., using computing resource 224, processor 320, communication interface 370, and/or the like) may receive historical data associated with multiple cloud computing environments, as described above.

As further shown in FIG. 4, process 400 may include training one or more machine learning models, with the historical data, to generate one or more trained machine learning models, wherein the training of the one or more machine learning models generates outputs (block 420). For example, the anomaly detection platform (e.g., using computing resource 224, processor 320, memory 330, and/or the like) may train one or more machine learning models, with the historical data, to generate one or more trained machine learning models, as described above. In some implementations, the training of the one or more machine learning models may generate outputs.

As further shown in FIG. 4, process 400 may include training a model with the outputs to generate a trained model (block 430). For example, the anomaly detection platform (e.g., using computing resource 224, processor 320, storage component 340, and/or the like) may train a model with the outputs to generate a trained model (e.g., a trained super model), as described above.

As further shown in FIG. 4, process 400 may include receiving particular data associated with a cloud computing environment, wherein the particular data at least includes data identifying usage of resources associated with the cloud computing environment (block 440). For example, the anomaly detection platform (e.g., using computing resource 224, processor 320, communication interface 370, and/or the like) may receive particular data associated with a cloud computing environment, as described above. In some implementations, the particular data may include at least data identifying usage of resources associated with the cloud computing environment.

As further shown in FIG. 4, process 400 may include processing the particular data, with the one or more trained machine learning models, to generate one or more anomaly scores indicating anomalous usage of the resources associated with the cloud computing environment (block 450). For example, the anomaly detection platform (e.g., using computing resource 224, processor 320, memory 330, and/or the like) may process the particular data, with the one or more trained machine learning models, to generate one or more anomaly scores indicating anomalous usage of the resources associated with the cloud computing environment, as described above.

As further shown in FIG. 4, process 400 may include processing the one or more anomaly scores, with the trained model, to generate a final anomaly score indicating anomalous usage of at least one of the resources associated with the cloud computing environment (block 460). For example, the anomaly detection platform (e.g., using computing resource 224, processor 320, storage component 340, and/or the like) may process the one or more anomaly scores, with the trained model, to generate a final anomaly score indicating anomalous usage of at least one of the resources associated with the cloud computing environment, as described above.

As further shown in FIG. 4, process 400 may include performing one or more actions based on the final anomaly score (block 470). For example, the anomaly detection platform (e.g., using computing resource 224, processor 320, memory 330, storage component 340, communication interface 370, and/or the like) may perform one or more actions based on the final anomaly score, as described above.

Process 400 may include additional implementations, such as any single implementation or any combination of implementations described below and/or in connection with one or more other processes described elsewhere herein.

In a first implementation, the anomaly detection platform may determine a multi-entity profile for the historical data associated with the multiple cloud computing environments, where the multi-entity profile includes data groupings of the historical data based on a set of attributes included in the historical data. The anomaly detections platform may identify trends and patterns in the historical data based on the data groupings of the multi-entity profile, and may train the one or more machine learning models, with the historical data and data identifying the trends and the patterns, to generate the one or more trained machine learning models.

In a second implementation, alone or in combination with the first implementation, the set of attributes may include one or more of an attribute identifying types of resources of the cloud computing environments, an attribute identifying tasks for which the resources are organized, an attribute identifying users of the resources, or an attribute identifying costs associated with the resources.

In a third implementation, alone or in combination with one or more of the first and second implementations, the historical data may include data identifying one or more of: types of resources of the cloud computing environments that are used by organizations, quantities of the resources that are used by the organizations, times of day or days of a week when the resources are used by the organizations, costs associated with the resources that are used by organizations, or a migration plan for an organization with regard to resources.

In a fourth implementation, alone or in combination with one or more of the first through third implementations, when performing the one or more actions, the anomaly detection platform may provide, for display, information indicating whether an anomaly has been detected based on the final anomaly score; may provide, to one of the resources, instructions that cause the at least one of the resources to reboot, power off, or power on based on the final anomaly score; may generate an alarm when the final anomaly score satisfies a threshold; may generate a recommendation to modify an allocation of the at least one of the resources based on the final anomaly score; and/or the like.

In a fifth implementation, alone or in combination with one or more of the first through fourth implementations, when performing the one or more actions, the anomaly detection platform may identify a cause of an anomaly based on the final anomaly score, may cause a robot to be dispatched to service the at least one of the resources based on the final anomaly score, may retrain the one or more machine learning models and/or the model based on the final anomaly score, may order a new resource to replace the at least one of the resources based on the final anomaly score, and/or the like.

In a sixth implementation, alone or in combination with one or more of the first through fifth implementations, the one or more machine learning models may include one or more of a kernel density estimation model, a regression splines model, a Gaussian process regression model, a discrete cosine transform signal processing model, a wavelet signal processing model, or a filter banks signal processing model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
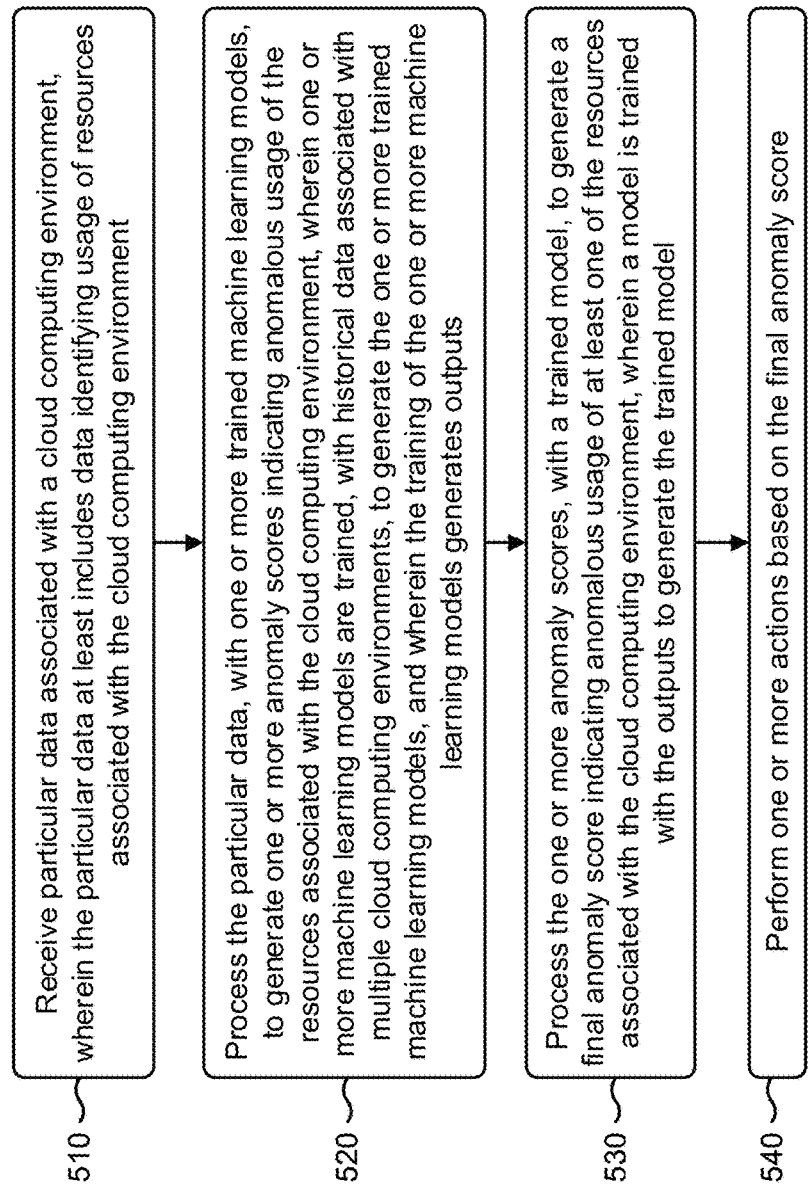

FIG. 5 is a flow chart of an example process 500 for utilizing machine learning models to process resource usage data and to determine anomalous usage of resources. In some implementations, one or more process blocks of FIG. 5 may be performed by an anomaly detection platform (e.g., anomaly detection platform 220). In some implementations, one or more process blocks of FIG. 5 may be performed by another device or a group of devices separate from or including the anomaly detection platform, such as a client device (e.g., client device 210) and/or a server device (e.g., server device 240).

As shown in FIG. 5, process 500 may include receiving particular data associated with a cloud computing environment, wherein the particular data at least includes data identifying usage of resources associated with the cloud computing environment (block 510). For example, the anomaly detection platform (e.g., using computing resource 224, processor 320, communication interface 370, and/or the like) may receive particular data associated with a cloud computing environment, as described above. In some implementations, the particular data may include at least data identifying usage of resources associated with the cloud computing environment.

As further shown in FIG. 5, process 500 may include processing the particular data, with one or more trained machine learning models, to generate one or more anomaly scores indicating anomalous usage of the resources associated with the cloud computing environment, wherein one or more machine learning models are trained, with historical data associated with multiple cloud computing environments, to generate the one or more trained machine learning models, and wherein the training of the one or more machine learning models generates outputs (block 520). For example, the anomaly detection platform (e.g., using computing resource 224, processor 320, memory 330, and/or the like) may process the particular data, with one or more trained machine learning models, to generate one or more anomaly scores indicating anomalous usage of the resources associated with the cloud computing environment, as described above. In some implementations, one or more machine learning models may be trained, with historical data associated with multiple cloud computing environments, to generate the one or more trained machine learning models. In some implementations, the training of the one or more machine learning models may generate outputs.

As further shown in FIG. 5, process 500 may include processing the one or more anomaly scores, with a trained model, to generate a final anomaly score indicating anomalous usage of at least one of the resources associated with the cloud computing environment, wherein a model is trained with the outputs to generate the trained model (block 530). For example, the anomaly detection platform (e.g., using computing resource 224, processor 320, storage component 340, and/or the like) may process the one or more anomaly scores, with a trained model, to generate a final anomaly score indicating anomalous usage of at least one of the resources associated with the cloud computing environment, as described above. In some implementations, a model may be trained with the outputs to generate the trained model.

As further shown in FIG. 5, process 500 may include performing one or more actions based on the final anomaly score (block 540). For example, the anomaly detection platform (e.g., using computing resource 224, processor 320, memory 330, storage component 340, communication interface 370, and/or the like) may perform one or more actions based on the final anomaly score, as described above.

Process 500 may include additional implementations, such as any single implementation or any combination of implementations described below and/or in connection with one or more other processes described elsewhere herein.

In a first implementation, the model may include one or more of a model that determines an average anomaly score based on the one or more anomaly scores, a model that determines a mean anomaly score based on the one or more anomaly scores, a model that selects an anomaly score from the one or more anomaly scores, or a model that determines a weighted average anomaly score based on the one or more anomaly scores.

In a second implementation, alone or in combination with the first implementation, when processing the one or more anomaly scores, with the trained model, to generate the final anomaly score, the anomaly detection platform may apply different weights to the one or more anomaly scores to generate one or more weighted anomaly scores, and may add the one or more weighted anomaly scores together to determine the final anomaly score.

In a third implementation, alone or in combination with one or more of the first and second implementations, when performing the one or more actions, the anomaly detection platform may determine a reallocation of the resources of the cloud computing environment based on the final anomaly score, and may cause the reallocation of the resources to be implemented by the cloud computing environment.

In a fourth implementation, alone or in combination with one or more of the first through third implementations, the resources of the cloud computing environment may include one or more of processing resources utilized by an organization, memory resources utilized by the organization, or network resources utilized by the organization.

In a fifth implementation, alone or in combination with one or more of the first through fourth implementations, when performing the one or more actions, the anomaly detection platform may identify a type of the at least one of the resources, and may determine a quantity of usage time of the at least one of the resources and a quantity of tasks performed by the at least one of the resources. The anomaly detection platform may determine a reallocation for the at least one of the resources based on the type of the at least one of the resources, the quantity of usage time of the at least one of the resources, and the quantity of tasks performed by the at least one of the resources, and may cause the reallocation to be implemented by the cloud computing environment.

In a sixth implementation, alone or in combination with one or more of the first through fifth implementations, when processing the one or more anomaly scores, with the trained model, to generate the final anomaly score, the anomaly detection platform may add the one or more anomaly scores together to generate a sum of the one or more anomaly scores, and may divide the sum of the one or more anomaly scores by a quantity of the one or more anomaly scores to determine an average anomaly score as the final anomaly score.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
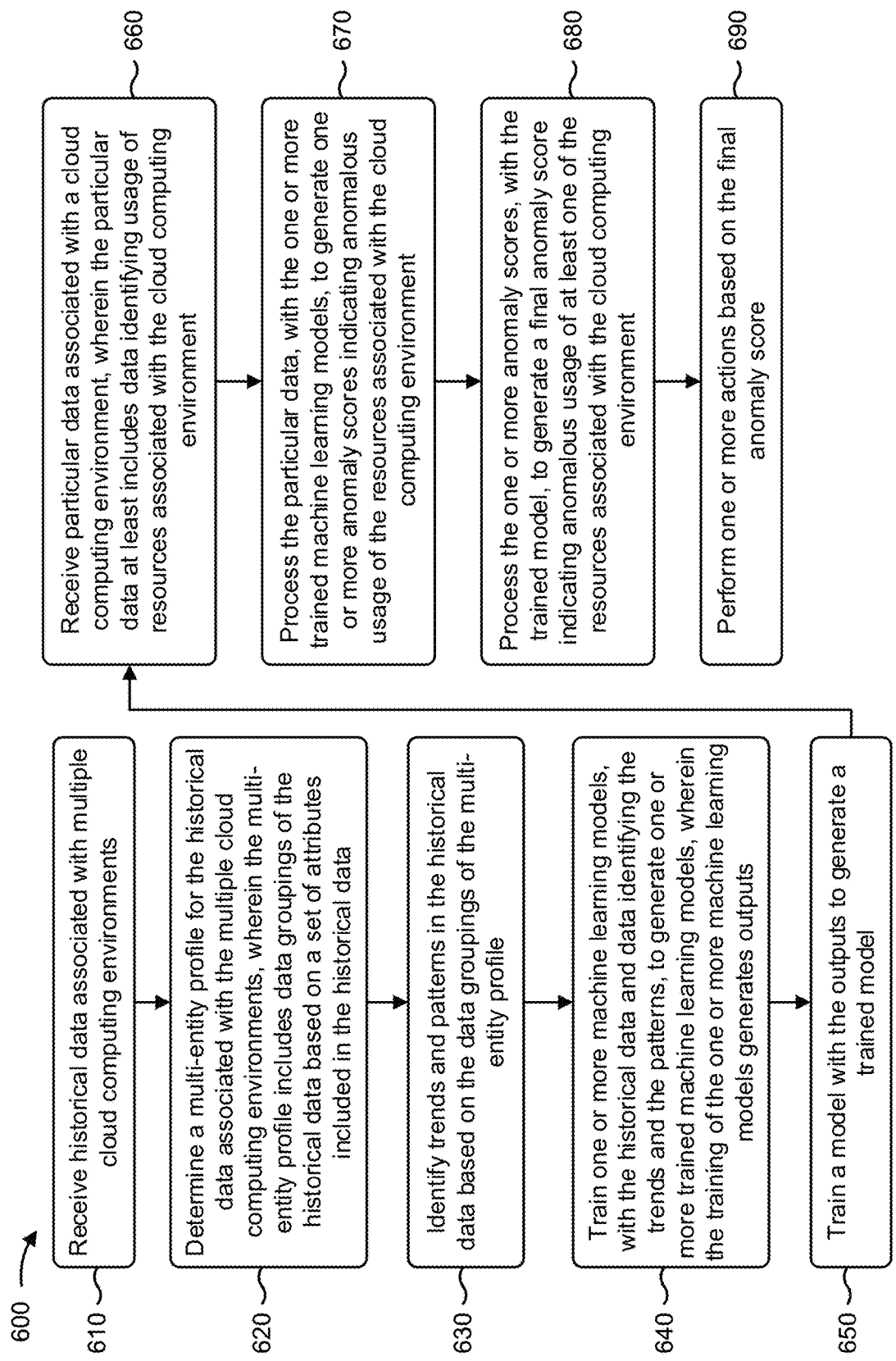

FIG. 6 is a flow chart of an example process 600 for utilizing machine learning models to process resource usage data and to determine anomalous usage of resources. In some implementations, one or more process blocks of FIG. 6 may be performed by an anomaly detection platform (e.g., anomaly detection platform 220). In some implementations, one or more process blocks of FIG. 6 may be performed by another device or a group of devices separate from or including the anomaly detection platform, such as a client device (e.g., client device 210) and/or a server device (e.g., server device 240).

As shown in FIG. 6, process 600 may include receiving historical data associated with multiple cloud computing environments (block 610). For example, the anomaly detection platform (e.g., using computing resource 224, processor 320, communication interface 370, and/or the like) may receive historical data associated with multiple cloud computing environments, as described above.

As further shown in FIG. 6, process 600 may include determining a multi-entity profile for the historical data associated with the multiple cloud computing environments, wherein the multi-entity profile includes data groupings of the historical data based on a set of attributes included in the historical data (block 620). For example, the anomaly detection platform (e.g., using computing resource 224, processor 320, memory 330, and/or the like) may determine a multi-entity profile for the historical data associated with the multiple cloud computing environments, as described above. In some implementations, the multi-entity profile may include data groupings of the historical data based on a set of attributes included in the historical data.

As further shown in FIG. 6, process 600 may include identifying trends and patterns in the historical data based on the data groupings of the multi-entity profile (block 630). For example, the anomaly detection platform (e.g., using computing resource 224, processor 320, storage component 340, and/or the like) may identify trends and patterns in the historical data based on the data groupings of the multi-entity profile, as described above.

As further shown in FIG. 6, process 600 may include training one or more machine learning models, with the historical data and data identifying the trends and the patterns, to generate one or more trained machine learning models, wherein the training of the one or more machine learning models generates outputs (block 640). For example, the anomaly detection platform (e.g., using computing resource 224, processor 320, memory 330, and/or the like) may train one or more machine learning models, with the historical data and data identifying the trends and the patterns, to generate one or more trained machine learning models, as described above. In some implementations, the training of the one or more machine learning models may generate outputs.

As further shown in FIG. 6, process 600 may include training a model with the outputs to generate a trained model (block 650). For example, the anomaly detection platform (e.g., using computing resource 224, processor 320, storage component 340, and/or the like) may train a model with the outputs to generate a trained model, as described above.

As further shown in FIG. 6, process 600 may include receiving particular data associated with a cloud computing environment, wherein the particular data at least includes data identifying usage of resources associated with the cloud computing environment (block 660). For example, the anomaly detection platform (e.g., using computing resource 224, processor 320, communication interface 370, and/or the like) may receive particular data associated with a cloud computing environment, as described above. In some implementations, the particular data may include at least data identifying usage of resources associated with the cloud computing environment.

As further shown in FIG. 6, process 600 may include processing the particular data, with the one or more trained machine learning models, to generate one or more anomaly scores indicating anomalous usage of the resources associated with the cloud computing environment (block 670). For example, the anomaly detection platform (e.g., using computing resource 224, processor 320, memory 330, and/or the like) may process the particular data, with the one or more trained machine learning models, to generate one or more anomaly scores indicating anomalous usage of the resources associated with the cloud computing environment, as described above.

As further shown in FIG. 6, process 600 may include processing the one or more anomaly scores, with the trained model, to generate a final anomaly score indicating anomalous usage of at least one of the resources associated with the cloud computing environment (block 680). For example, the anomaly detection platform (e.g., using computing resource 224, processor 320, storage component 340, and/or the like) may process the one or more anomaly scores, with the trained model, to generate a final anomaly score indicating anomalous usage of at least one of the resources associated with the cloud computing environment, as described above.

As further shown in FIG. 6, process 600 may include performing one or more actions based on the final anomaly score (block 690). For example, the anomaly detection platform (e.g., using computing resource 224, processor 320, memory 330, storage component 340, communication interface 370, and/or the like) may perform one or more actions based on the final anomaly score, as described above.

Process 600 may include additional implementations, such as any single implementation or any combination of implementations described below and/or in connection with one or more other processes described elsewhere herein.

In a first implementation, when performing the one or more actions, the anomaly detection platform may provide, for display, information indicating whether an anomaly has been detected based on the final anomaly score; may provide, to one of the resources, instructions that cause the at least one of the resources to reboot, power off, or power on based on the final anomaly score; may generate an alarm when the final anomaly score satisfies a threshold; may generate a recommendation to modify an allocation of the at least one of the resources based on the final anomaly score; and/or the like.

In a second implementation, alone or in combination with the first implementation, when performing one or more actions, the anomaly detection platform may identify a cause of an anomaly based on the final anomaly score, may cause a robot to be dispatched to service the at least one of the resources based on the final anomaly score, may retrain the one or more machine learning models and/or the model based on the final anomaly score, may order a new resource to replace the at least one of the resources based on the final anomaly score, and/or the like.

In a third implementation, alone or in combination with one or more of the first and second implementations, when processing the one or more anomaly scores, with the trained model, to generate the final anomaly score, the anomaly detection platform may apply different weights to the one or more anomaly scores to generate one or more weighted anomaly scores. The anomaly detection platform may add the one or more weighted anomaly scores together to determine the final anomaly score.

In a fourth implementation, alone or in combination with one or more of the first through third implementations, when performing the one or more actions, the anomaly detection platform may identify a type of the at least one of the resources, and may determine a quantity of usage time of the at least one of the resources and a quantity of tasks performed by the at least one of the resources. The anomaly detection platform may determine a reallocation for the at least one of the resources based on the type of the at least one of the resources, the quantity of usage time of the at least one of the resources, and the quantity of tasks performed by the at least one of the resources, and may cause the reallocation to be implemented by the cloud computing environment.

In a fifth implementation, alone or in combination with one or more of the first through fourth implementations, when processing the one or more anomaly scores, with the trained model, to generate the final anomaly score, the anomaly detection platform may add the one or more anomaly scores together to generate a sum of the one or more anomaly scores, and may divide the sum of the one or more anomaly scores by a quantity of the one or more anomaly scores to determine an average anomaly score as the final anomaly score.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, historical data associated with multiple cloud computing environments;
  training, by the device, one or more machine learning models, with the historical data, to generate one or more trained machine learning models,
    wherein the training of the one or more machine learning models generates outputs;
  applying, by the device, weights to the outputs based on an amount of change or a percent change associated with the outputs;
  generating, by the device, a super model with the outputs,
    wherein the super model is first trained based on synthetic training data,
    wherein the super model is trained based on combining first output of a kernel density estimation model, of the one or more machine learning models, and a second output of a quantile model of the one or more machine learning models, and
    wherein the synthetic training data changes based on addition of the kernel density estimation model and the quantile model to the super model;

receiving, by the device, current data associated with a cloud computing environment, of the multiple cloud computing environments,
   wherein the current data at least includes data identifying usage of resources associated with the cloud computing environment;
processing, by the device, the current data, with the one or more trained machine learning models, to generate one or more anomaly scores indicating anomalous usage of the resources associated with the cloud computing environment,
   wherein processing the current data, with a discrete cosine transform signal processing model, of the one or more trained machine learning models, comprises:
      analyzing, over a time period, frequency spectrums of usage data of individual virtual machines, of the resources, to identify changes in usage patterns, and
      comparing outputs, generated by analyzing the frequency spectrums of usage data, with outputs from different time periods;
processing, by the device, the one or more anomaly scores, with the super model, to generate a final anomaly score indicating anomalous usage of at least one of the resources associated with the cloud computing environment,
   wherein the super model applies different weights to a first anomaly score generated by the kernel density estimation model, a second anomaly score generated by the discrete cosine transform signal processing model to generate the final anomaly score; and
performing, by the device, one or more actions based on the final anomaly score.

2. The method of claim 1, further comprising:
determining a multi-entity profile for the historical data associated with the multiple cloud computing environments,
   wherein the multi-entity profile includes data groupings of the historical data based on a set of attributes included in the historical data; and
identifying trends and patterns in the historical data based on the data groupings of the multi-entity profile,
   wherein the training the one or more machine learning models, with the historical data, to generate the one or more trained machine learning models includes:
      training the one or more machine learning models, with the historical data and data identifying the trends and the patterns, to generate the one or more trained machine learning models.

3. The method of claim 2, wherein the set of attributes include one or more of:
an attribute identifying types of resources associated with the cloud computing environment,
an attribute identifying tasks for which the resources associated with the cloud computing environment are organized,
an attribute identifying users of the resources associated with the cloud computing environment, or
an attribute identifying costs associated with the resources associated with the cloud computing environment.

4. The method of claim 1, wherein the historical data includes data identifying one or more of:
types of resources associated with the cloud computing environment that are used by organizations,
quantities of the resources associated with the cloud computing environment that are used by the organizations,
times of day or days of a week when the resources associated with the cloud computing environment are used by the organizations,
costs associated with the resources associated with the cloud computing environment that are used by organizations, or
a migration plan for an organization with regard to the resources associated with the cloud computing environment.

5. The method of claim 1, wherein performing the one or more actions includes one or more of:
providing, for display, information indicating whether an anomaly has been detected based on the final anomaly score;
providing, to one of the resources associated with the cloud computing environment, instructions that cause the at least one of the resources associated with the cloud computing environment to reboot, power off, or power on based on the final anomaly score;
generating an alarm when the final anomaly score satisfies a threshold; or
generating a recommendation to modify an allocation of the at least one of the resources associated with the cloud computing environment based on the final anomaly score.

6. The method of claim 1, wherein performing the one or more actions includes one or more of:
identifying a cause of an anomaly based on the final anomaly score;
causing a robot to be dispatched to service the at least one of the resources associated with the cloud computing environment based on the final anomaly score;
retraining the one or more machine learning models and/or the super model based on the final anomaly score; or
ordering a new resource to replace the at least one of the resources associated with the cloud computing environment based on the final anomaly score.

7. The method of claim 1, wherein the one or more machine learning models include one or more of:
a regression splines model,
a Gaussian process regression model,
a wavelet signal processing model, or
a filter banks signal processing model.

8. A device, comprising:
one or more memories; and
one or more processors, coupled to the one or more memories, to:
   receive current data associated with a cloud computing environment,
      wherein the current data at least includes data identifying usage of resources associated with the cloud computing environment;
   process the current data, with one or more trained machine learning models, to generate one or more anomaly scores indicating anomalous usage of the resources associated with the cloud computing environment,
      wherein one or more machine learning models are trained, with historical data associated with multiple cloud computing environments,
      wherein the training of the one or more machine learning models generates outputs, and
      wherein the one or more processors, to process the current data, with a discrete cosine transform signal processing model, of the one or more trained machine learning models, are to:

analyze, over a time period, frequency spectrums of usage data of individual virtual machines, of the resources, to identify changes in usage patterns; and compare outputs, generated by analyzing the frequency spectrums of usage data, with outputs from different time periods;

apply weights to the outputs based on an amount of change or a percent change associated with the outputs;

generate a super model using the outputs,
wherein the super model is first trained based on synthetic training data,
wherein the super model is trained based on combining first output of a kernel density estimation model, of the one or more machine learning models, and a second output of a quantile model of the one or more machine learning models, and
wherein the synthetic training data changes based on addition of the kernel density estimation model and the quantile model to the super model;

process the one or more anomaly scores, with the super model, to generate a final anomaly score indicating anomalous usage of at least one of the resources associated with the cloud computing environment,
wherein the super model applies different weights to a first anomaly score generated by the kernel density estimation model, a second anomaly score generated by the discrete cosine transform signal processing model to generate the final anomaly score; and perform one or more actions based on the final anomaly score.

9. The device of claim 8, wherein the super model includes one or more of:
a model that determines an average anomaly score based on the one or more anomaly scores,
a model that determines a mean anomaly score based on the one or more anomaly scores,
a model that selects an anomaly score from the one or more anomaly scores, or
a model that determines a weighted average anomaly score based on the one or more anomaly scores.

10. The device of claim 8, wherein, to process the one or more anomaly scores, with the super model, to generate the final anomaly score, the one or more processors are to:
apply different weights to the one or more anomaly scores to generate one or more weighted anomaly scores; and
add the one or more weighted anomaly scores together to determine the final anomaly score.

11. The device of claim 8, wherein, to perform the one or more actions, the one or more processors are to:
determine a reallocation of the resources associated with the cloud computing environment based on the final anomaly score; and
cause the reallocation of the resources associated with the cloud computing environment to be implemented by the cloud computing environment.

12. The device of claim 8, wherein the resources associated with the cloud computing environment include one or more of:
processing resources utilized by an organization,
memory resources utilized by the organization, or
network resources utilized by the organization.

13. The device of claim 8, wherein, to perform the one or more actions, the one or more processors are to:

identify a type of the at least one of the resources associated with the cloud computing environment;
determine a quantity of usage time of the at least one of the resources associated with the cloud computing environment;
determine a quantity of tasks performed by the at least one of the resources associated with the cloud computing environment;
determine a reallocation for the at least one of the resources associated with the cloud computing environment based on the type of the at least one of the resources associated with the cloud computing environment, the quantity of usage time of the at least one of the resources associated with the cloud computing environment, and the quantity of tasks performed by the at least one of the resources associated with the cloud computing environment; and
cause the reallocation to be implemented by the cloud computing environment.

14. The device of claim 8, wherein, to process the one or more anomaly scores, with the super model, to generate the final anomaly score, the one or more processors are to:
add the one or more anomaly scores together to generate a sum of the one or more anomaly scores; and
divide the sum of the one or more anomaly scores by a quantity of the one or more anomaly scores to determine an average anomaly score as the final anomaly score.

15. A non-transitory computer-readable medium storing instructions, the instructions comprising:
one or more instructions that, when executed by one or more processors, cause the one or more processors to:
receive historical data associated with multiple cloud computing environments;
determine a multi-entity profile for the historical data associated with the multiple cloud computing environments,
wherein the multi-entity profile includes data groupings of the historical data based on a set of attributes included in the historical data;
identify trends and patterns in the historical data based on the data groupings of the multi-entity profile;
train one or more machine learning models, with the historical data and data identifying the trends and the patterns, to generate one or more trained machine learning models,
wherein the training of the one or more machine learning models generates outputs;
apply weights to the outputs based on an amount of change or a percent change associated with the outputs;
generate a super model using the outputs,
wherein the super model is first trained based on synthetic training data,
wherein the super model is trained based on combining first output of a kernel density estimation model, of the one or more machine learning models, and a second output of a quantile model of the one or more machine learning models, and
wherein the synthetic training data changes based on addition of the kernel density estimation model and the quantile model to the super model;
receive current data associated with a cloud computing environment,
wherein the current data at least includes data identifying usage of resources associated with the cloud computing environment;

process the current data, with the one or more trained machine learning models, to generate one or more anomaly scores indicating anomalous usage of the resources associated with the cloud computing environment,
   wherein the one or more instructions, that cause the one or more processors to process the current data, with a discrete cosine transform signal processing model, of the one or more trained machine learning models, cause the one or more processors to:
      analyze, over a time period, frequency spectrums of usage data of individual virtual machines, of the resources, to identify changes in usage patterns, and
      compare outputs, generated by analyzing the frequency spectrums of usage data, with outputs from different time periods;
process the one or more anomaly scores, with the super model, to generate a final anomaly score indicating anomalous usage of at least one of the resources associated with the cloud computing environment,
   wherein the super model applies different weights to a first anomaly score generated by the kernel density estimation model, a second anomaly score generated by the discrete cosine transform signal processing model to generate the final anomaly score; and
perform one or more actions based on the final anomaly score.

16. The non-transitory computer-readable medium of claim 15, wherein the one or more instructions, that cause the one or more processors to perform the one or more actions, cause the one or more processors to one or more of:
   provide, for display, information indicating whether an anomaly has been detected based on the final anomaly score;
   provide, to one of the resources associated with the cloud computing environment, instructions that cause the at least one of the resources associated with the cloud computing environment to reboot, power off, or power on based on the final anomaly score;
   generate an alarm when the final anomaly score satisfies a threshold; or
   generate a recommendation to modify an allocation of the at least one of the resources associated with the cloud computing environment based on the final anomaly score.

17. The non-transitory computer-readable medium of claim 15, wherein the one or more instructions, that cause the one or more processors to perform the one or more actions, cause the one or more processors to one or more of:
   identify a cause of an anomaly based on the final anomaly score;
   cause a robot to be dispatched to service the at least one of the resources associated with the cloud computing environment based on the final anomaly score;
   retrain the one or more machine learning models and/or the super model based on the final anomaly score; or
   order a new resource to replace the at least one of the resources associated with the cloud computing environment based on the final anomaly score.

18. The non-transitory computer-readable medium of claim 15, wherein the one or more instructions, that cause the one or more processors to process the one or more anomaly scores, with the super model, to generate the final anomaly score, cause the one or more processors to:
   apply different weights to the one or more anomaly scores to generate one or more weighted anomaly scores; and
   add the one or more weighted anomaly scores together to determine the final anomaly score.

19. The non-transitory computer-readable medium of claim 15, wherein the one or more instructions, that cause the one or more processors to perform the one or more actions, cause the one or more processors to:
   identify a type of the at least one of the resources associated with the cloud computing environment;
   determine a quantity of usage time of the at least one of the resources associated with the cloud computing environment;
   determine a quantity of tasks performed by the at least one of the resources associated with the cloud computing environment;
   determine a reallocation for the at least one of the resources associated with the cloud computing environment based on the type of the at least one of the resources associated with the cloud computing environment, the quantity of usage time of the at least one of the resources associated with the cloud computing environment, and the quantity of tasks performed by the at least one of the resources associated with the cloud computing environment; and
   cause the reallocation to be implemented by the cloud computing environment.

20. The non-transitory computer-readable medium of claim 15, wherein the one or more instructions, that cause the one or more processors to process the one or more anomaly scores, with the super model, to generate the final anomaly score, cause the one or more processors to:
   add the one or more anomaly scores together to generate a sum of the one or more anomaly scores; and
   divide the sum of the one or more anomaly scores by power
   of the one or more anomaly scores to determine an average anomaly score as the final anomaly score.

* * * * *